(12) United States Patent
Miura

(10) Patent No.: US 7,886,617 B2
(45) Date of Patent: Feb. 15, 2011

(54) CLOTH FOR ELECTRIC DEVICE

(75) Inventor: Hiroaki Miura, Kamakura (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 285 days.

(21) Appl. No.: 12/160,701

(22) PCT Filed: Jan. 12, 2007

(86) PCT No.: PCT/JP2007/050313

§ 371 (c)(1),
(2), (4) Date: Jul. 11, 2008

(87) PCT Pub. No.: WO2007/080959

PCT Pub. Date: Jul. 19, 2007

(65) Prior Publication Data

US 2010/0164478 A1 Jul. 1, 2010

(30) Foreign Application Priority Data

Jan. 13, 2006 (JP) ............... 2006-006441
Oct. 16, 2006 (JP) ............... 2006-281350

(51) Int. Cl.
*G01L 5/00* (2006.01)

(52) U.S. Cl. ............... 73/862.01; 73/862.391

(58) Field of Classification Search ............ 73/862.01, 73/862.381, 862.391, 760–860
See application file for complete search history.

(56) References Cited

U.S. PATENT DOCUMENTS

| 4,476,206 | A | * | 10/1984 | Viala et al. ............... 429/234 |
| 5,379,644 | A | * | 1/1995 | Yanagida et al. .......... 73/787 |
| 7,244,497 | B2 | | 7/2007 | Hartmann et al. |
| 2006/0124470 | A1 | | 6/2006 | Zama et al. |
| 2008/0191177 | A1 | * | 8/2008 | Mainwaring et al. ..... 252/511 |
| 2009/0033341 | A1 | * | 2/2009 | Son et al. ................. 324/663 |

FOREIGN PATENT DOCUMENTS

| JP | 6-209825 A | 8/1994 |
| JP | 11-159443 A | 6/1999 |
| JP | 3141566 B2 | 12/2000 |
| JP | 2001-122010 A | 5/2001 |
| JP | 2002-203996 A | 7/2002 |
| JP | 2003-33262 A | 2/2003 |
| JP | 2004-216868 A | 8/2004 |
| JP | 2005-503497 A | 2/2005 |
| JP | 2006-241613 A | 9/2006 |
| WO | WO 03/027365 A1 | 4/2003 |

* cited by examiner

*Primary Examiner*—Max Noori
(74) *Attorney, Agent, or Firm*—Foley & Lardner LLP

(57) ABSTRACT

Cloth in which fibers include conductive polymer fibers in order to provide a sensor and an actuator, which use cloth including excellent sensing function and actuation function.

13 Claims, 37 Drawing Sheets

(a)

(b)

(c)

(d)

(e)

(a)

(b)

(a)

(b)

(c)

(d)

(a)

(b)

(c)

(a)

(b)

(a)

(b)

(c)

CLOTH FOR ELECTRIC DEVICE

TECHNICAL FIELD

The present invention relates to cloth including an element capable of converting a mechanical input into electricity and other energies and sensing the mechanical input concerned, the element being such as a conductive knitted or woven device, for example, a planar sensor for obtaining positional information in a surface pressure measurement, a coordinate measurement and the like, or relates to cloth including an element capable of functioning as an actuator that converts the electric energy into the mechanical energy.

BACKGROUND ART

Heretofore, as a planar pressure sensor for general use, there has been a pressure sensor in a mode of reading a resistance change caused by receiving compression, in which carbon particles are mixed into rubber. Besides this, there have been a pressure sensor in a mode where a mechanical or pneumatic pressure gauge is applied, and the like. However, in general, these pressure sensors have had some thickness and weight, and have been required to be additionally installed on a surface desired to be evaluated.

In consideration for these, as an example of a sensor using a piezoelectric material, which becomes capable of performing sensing in a lightweight/space-saving body, there is a piezoelectric fabric device described in Patent Document 1. This piezoelectric fabric device detects an electric signal that follows deformation of the piezoelectric material, thus becoming capable of performing the planar sensing. However, the piezoelectric fabric device uses the piezoelectric material, and accordingly, the signal obtained by the piezoelectric fabric device is generated as an instantaneous signal of a time of receiving force, and a continuous signal cannot be obtained. Therefore, static sensing information cannot be obtained. Moreover, the piezoelectric fabric device is formed by using, as warp yarns and/or weft yarns, piezoelectric fibers having a rectangular or flat cross-sectional shape, and accordingly, the number of sensing elements is limited by a width of the piezoelectric fibers, and detailed surface information exceeding such a piezoelectric fiber width cannot be obtained.

With regard to a multicomponent fiber, there is a multicomponent fiber capable of containing, as an additive, conductive fiber or particles such as graphite and activated carbon, which is described in Patent Document 2. However, the multicomponent fiber described in Patent Document 2 is merely a fiber capable of containing the conductive fiber or particles, and the pressure sensor or the actuator is not disclosed therein.

Patent Document 1: Japanese Patent Laid-Open Publication No. 2002-203996

Patent Document 2: Japanese Patent Application Publication No. 2005-503497

DISCLOSURE OF THE INVENTION

Cloth for an electric device according to the present invention is summarized to include: bundles made of fibers including conductive polymer fibers, wherein terminals are provided on an outside of a region on which force acts in the bundles.

Pressure sensing cloth according to the present invention is summarized to include: bundles made of fibers including conductive polymer fibers, wherein terminals connected to a current value and/or resistance value detection device that measures a current value and/or resistance value of the conductive fibers included in the bundles are provided on an outside of a region on which force acts in the bundles.

Actuation cloth according to the present invention is summarized to include: bundles made of fibers including conductive polymer fibers, wherein terminals connected to a voltage application device that applies a voltage to the conductive fibers included in the bundles are provided on an outside of a region on which force acts in the bundles.

A vehicular component according to the present invention is summarized to use any one of: the cloth for an electric device; the pressure sensing cloth; and the actuation cloth.

BEST MODE FOR CARRYING OUT THE INVENTION (Cloth)

As one of features, cloth according to the present invention is made of single or plural fibers, and the fibers include conductive polymer fibers. Here, a fabric and a knit are included in the cloth.

Figure 1:
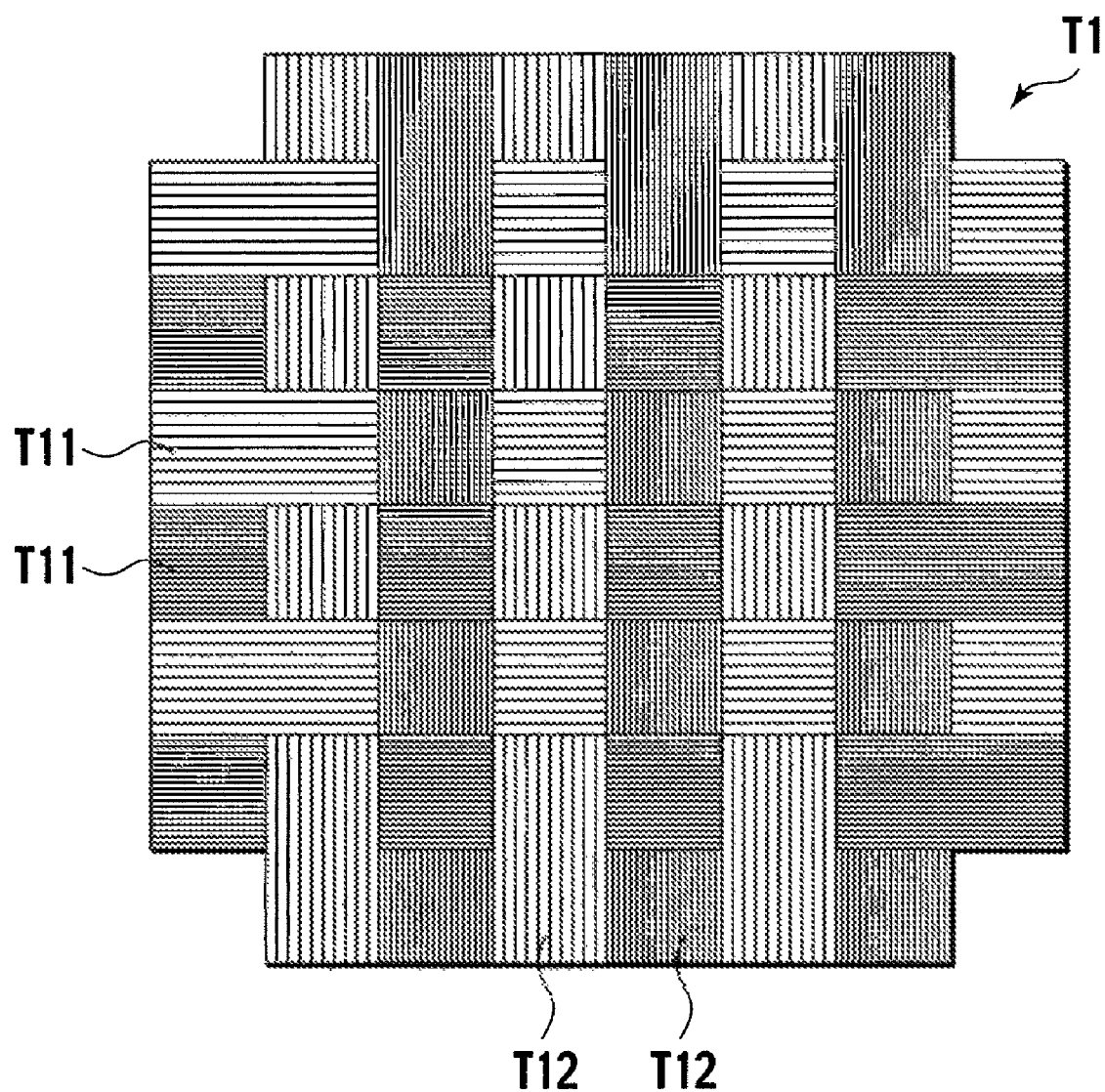
FIG. 1 is a schematic view showing a shape example of a fabric.
Figure 2:
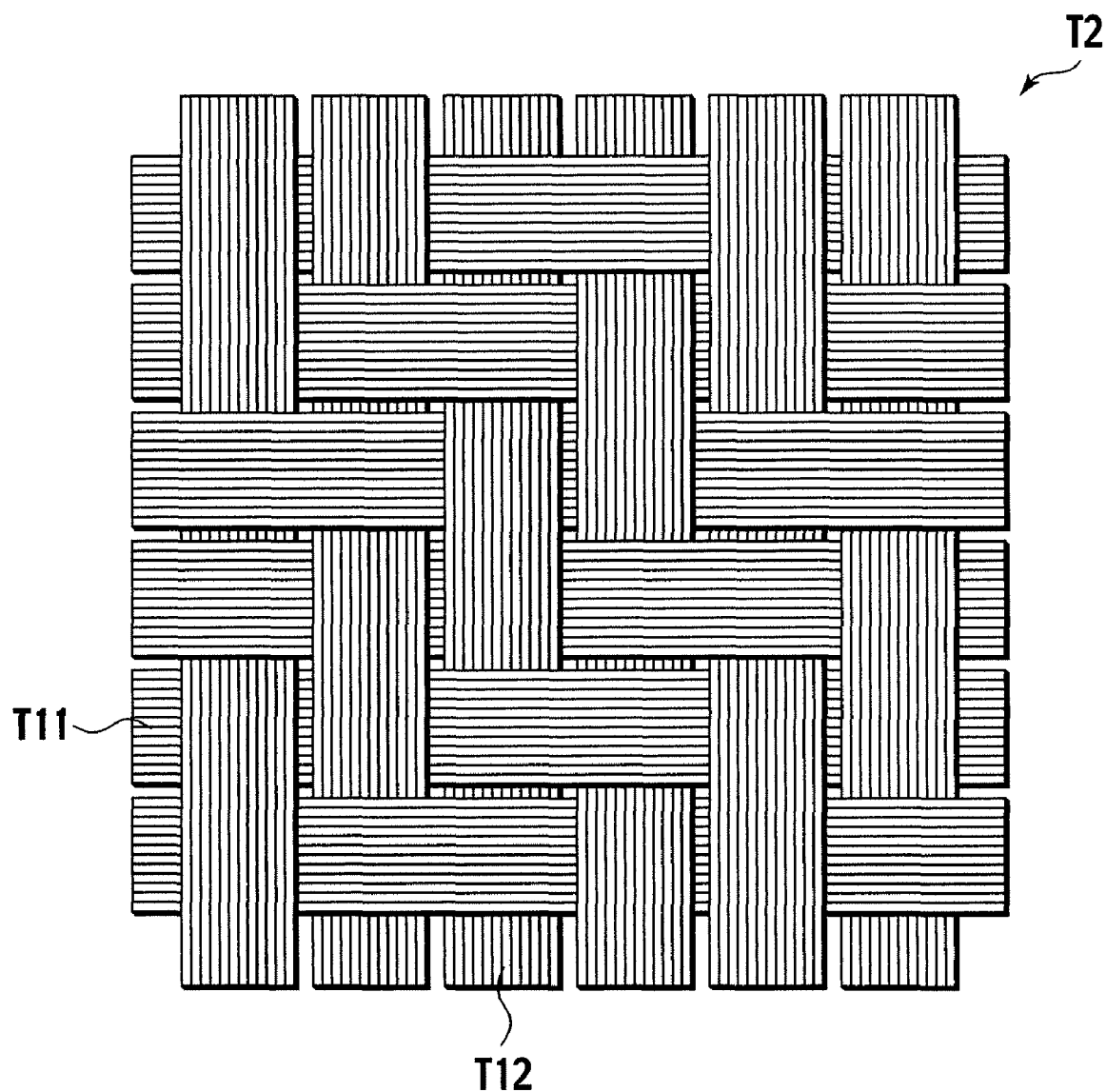
FIG. 2 is a schematic view showing a shape example of the fabric.
Figure 3:
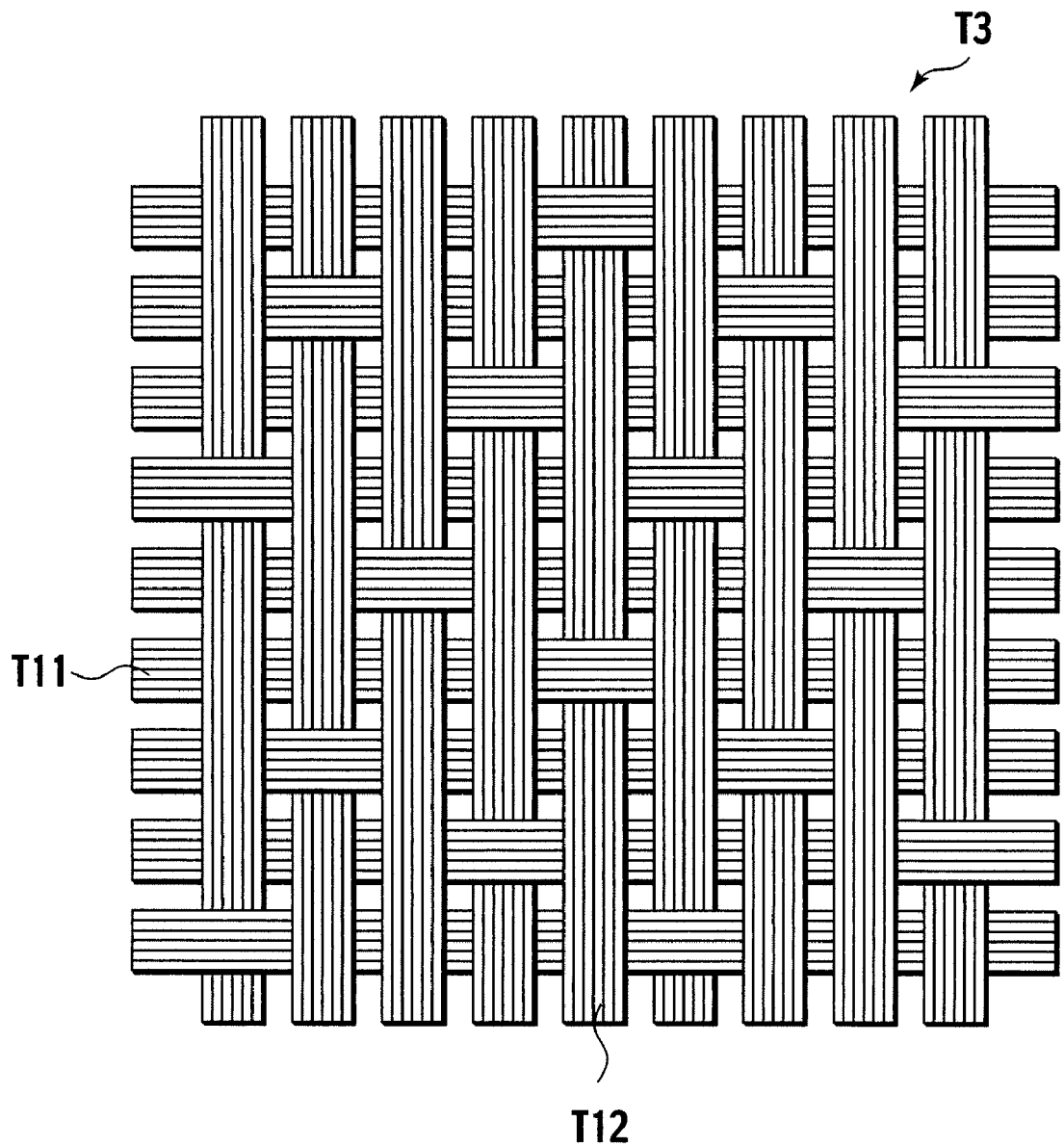
FIG. 3 is a schematic view showing a shape example of the fabric.
Figure 4:
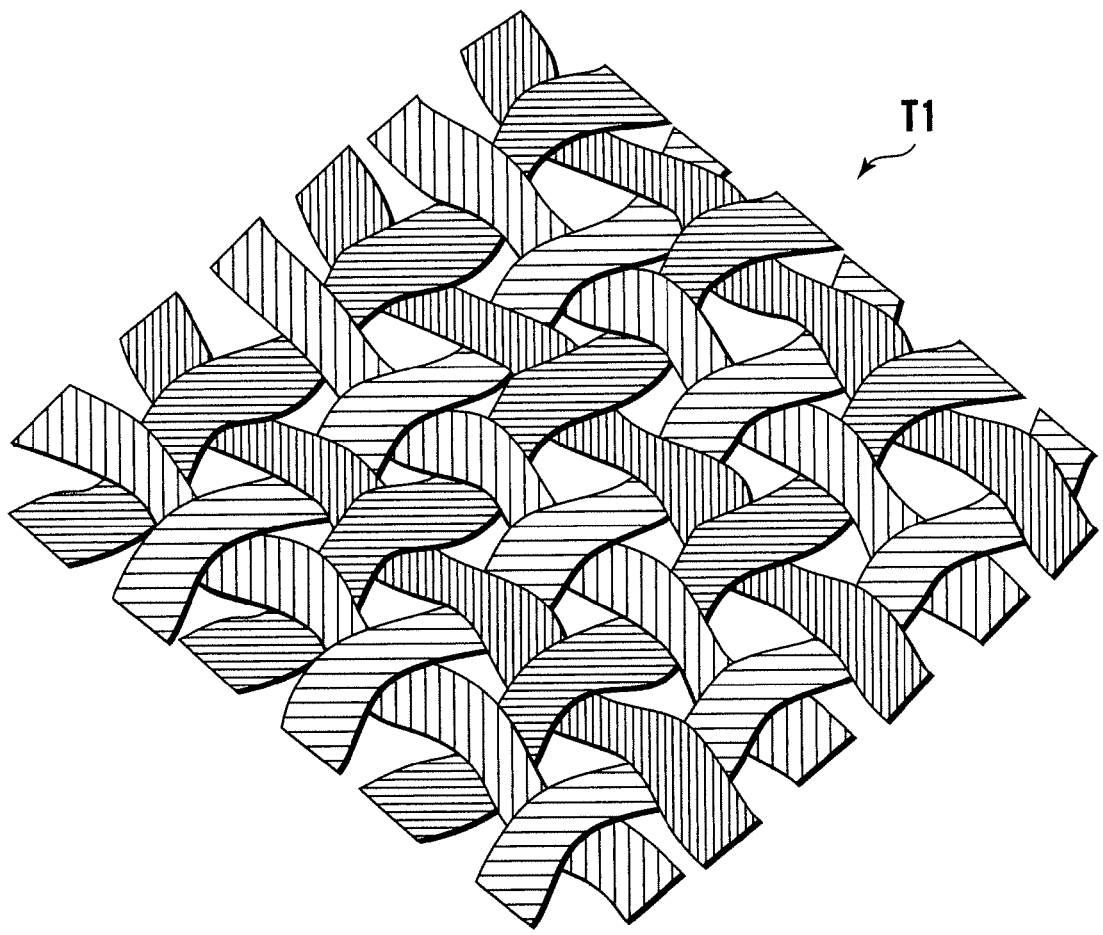
FIG. 4 is a perspective view showing a shape example of the fabric.
Figure 4:
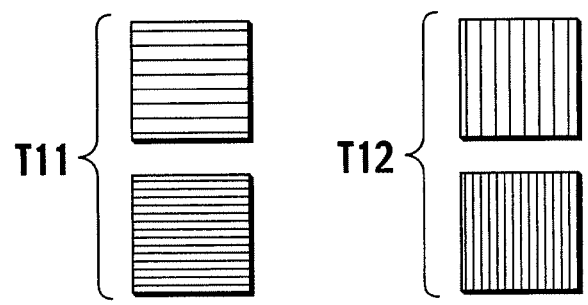

A general fabric is a fabric having warp yarns and weft yarns which intersect perpendicularly with each other, are brought into intimate contact with the adjacent yarns leaving no space therebetween, and are continuous therewith in a planar manner. In a method of weaving the fabric, basically, there are a plain weave, a diagonal weave, and a sateen weave. As shown by a schematic view in FIG. 1, the plain weave fabric T1 is a fabric woven by alternately intersecting warp yarns T12 and weft yarns T11. As shown by a schematic view in FIG. 2, the diagonal weave fabric T2 is a fabric woven by continuing two or more of the warp yarns T12 and the weft yarns T11. As shown by a schematic view in FIG. 3, the sateen weave fabric T3 is a fabric woven by combining five or more of the warp yarns T12 and the weft yarns T11. A perspective view of the plain weave fabric T1 is shown in FIG. 4.

An intention of the present invention is to allow fibers composing the warp yarns and/or the weft yarns of these plain weave, diagonal weave and sateen weave fabrics or other fabrics to contain the conductive polymer fibers. From this, functions such as a sensing function and an actuating function can be imparted to the fabrics without impairing pliability and feeling of the fabrics made of the fibers. Hence, in order to perform such sensing and actuation, the conductive polymer fibers are contained in predetermined spots, whereby it becomes possible to obtain deformation information at a specific spot of each of the fabrics by the sensing, or it becomes +possible to actuate the specific spot. Moreover, the conductive fibers are used as a sensor element and an actuator element, whereby the sensor element and the actuator element can be functionalized by the cloth itself. Accordingly, though a space is saved, by fineness of the fabric or the knit, the sensing can be performed in a high density, and the actuation can be performed precisely.

Figure 5:
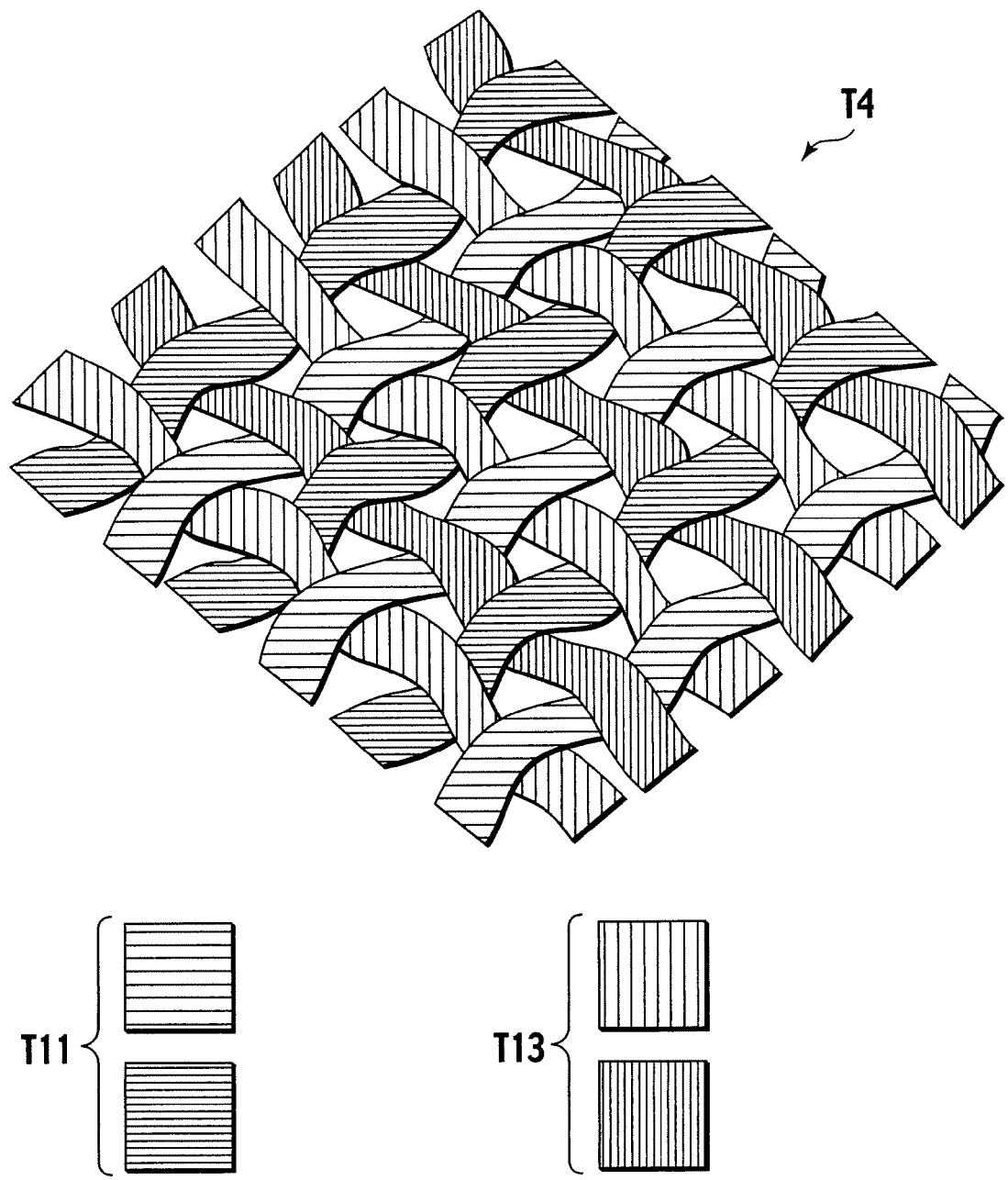
FIG. 5 is a perspective view showing a shape example of the fabric.
Figure 6:
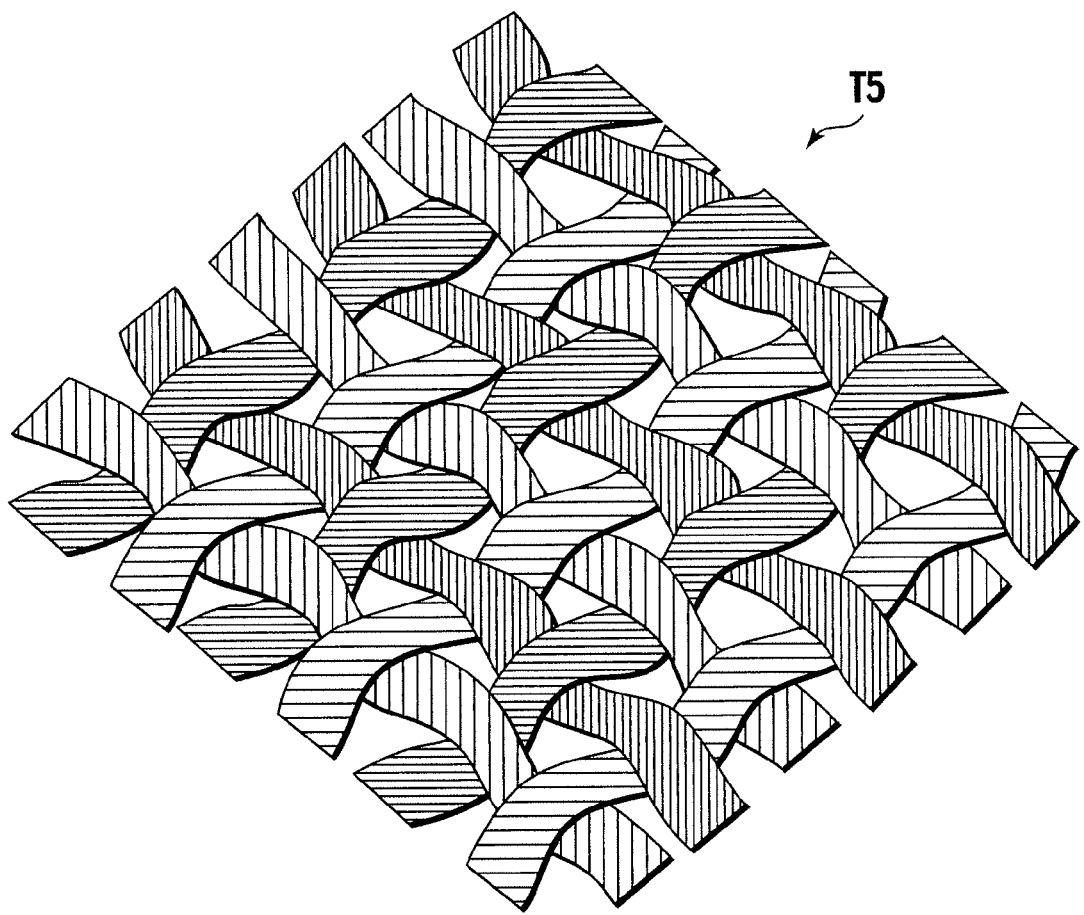
FIG. 6 is a perspective view showing a shape example of the fabric.
Figure 6:
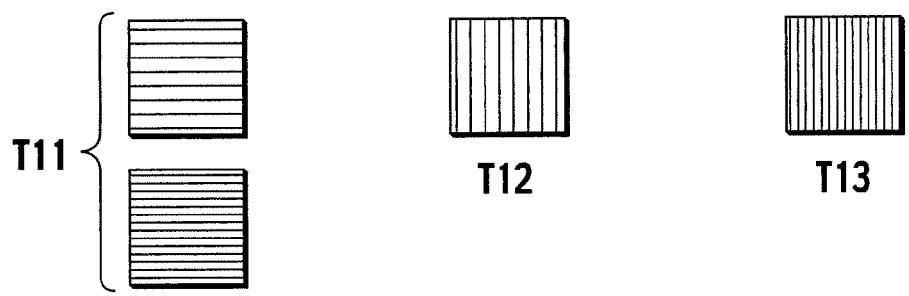

In the case of applying the cloth of the present invention to the fabric, it is naturally possible to contain the conductive polymer fibers in either of the warp yarns or weft yarns of the fabric or both of the warp yarns and the weft yarns according to needs. Moreover, the cloth may be a fabric to which an oblique weave and the like are added, or a fabric in which a necessary space portion is provided. With such a configuration, a fabric that obtains the information in an appropriate density can be formed. By a perspective view in FIG. 5, an example of using the conductive fibers for warp yarns T13 of a plain weave fabric T4 is shown. Moreover, it is not always necessary to use the conductive polymer fibers for the entire surface of the fabric, and it is also possible to adopt a design configuration according to needs, in which an installation density of the conductive polymer fibers is made to differ in the surface. As an example, by a perspective view in FIG. 6, one is shown, in which the warp yarns T12 made of fibers having no conductivity and the warp yarns T13 made of the conductive polymer fibers are used in combination as the warp yarns of the plain weave fabric T5.

Figure 7:
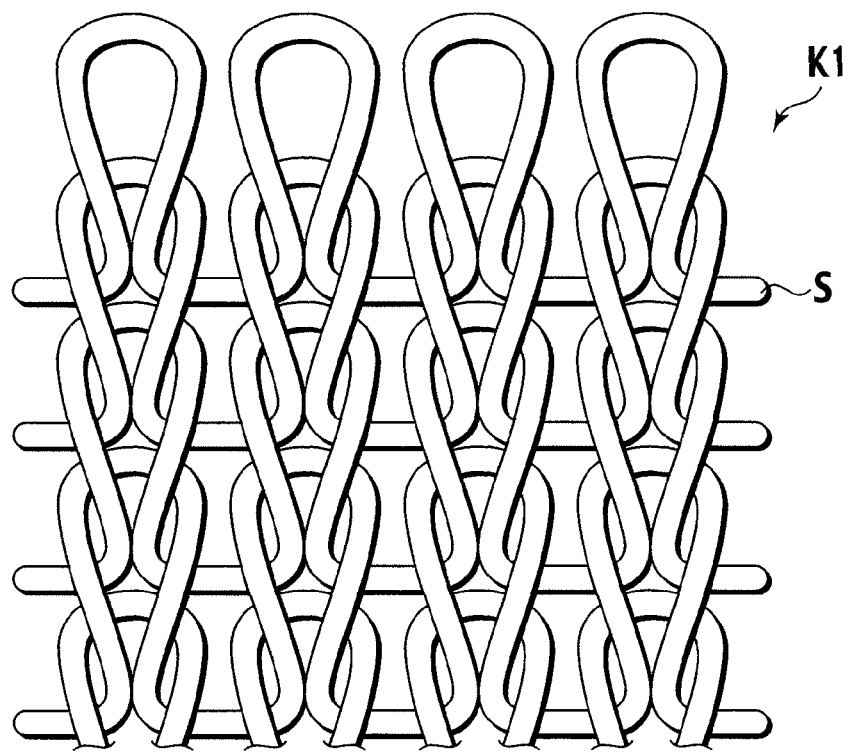
FIG. 7 is a schematic view showing a shape example of a knit.
Figure 8:
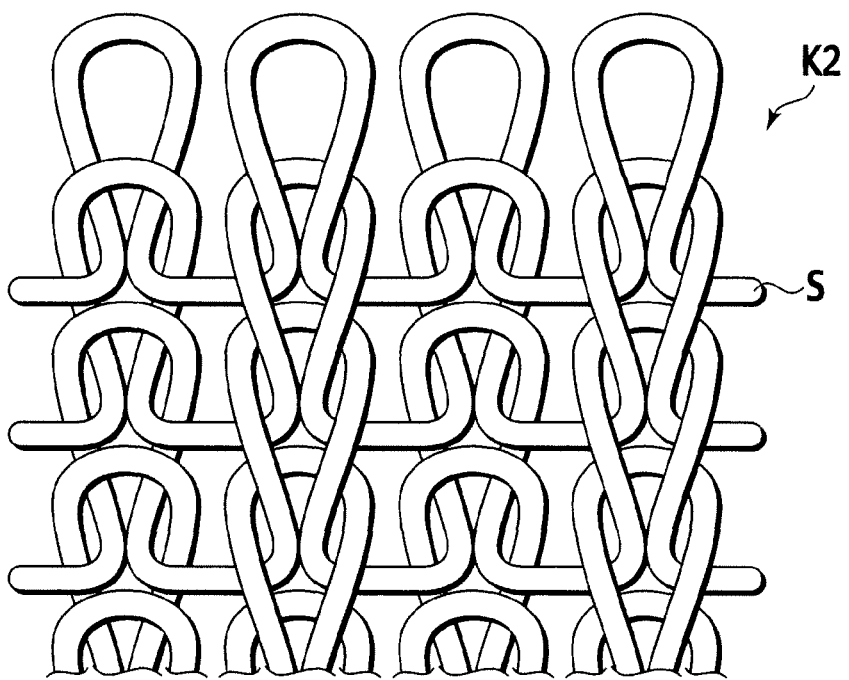
FIG. 8 is a schematic view showing a shape example of the knit.
Figure 9:
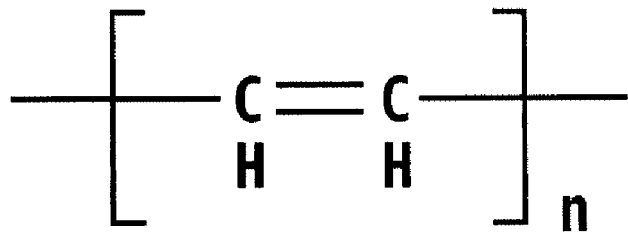
FIG. 9 is examples of chemical formulas of acetylene conductive polymers.
Figure 9:
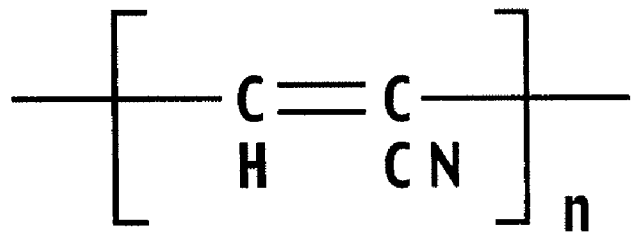
Figure 9:
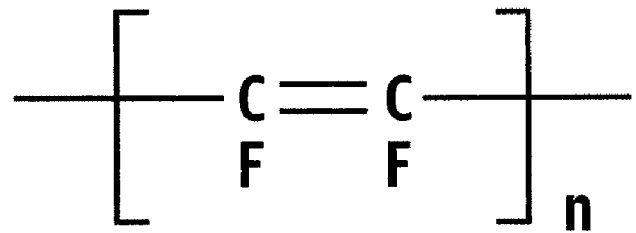
Figure 9:
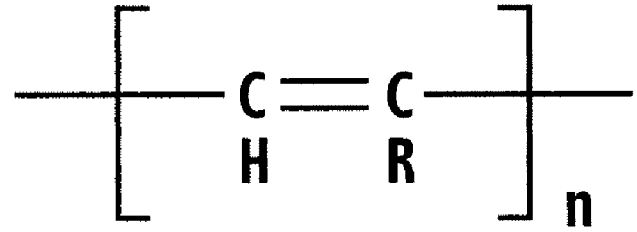
Figure 9:
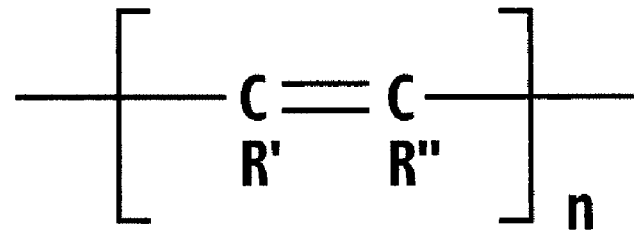

It is also possible for the cloth of the present invention to take a form of a knit besides such a form of the fabric as described above. In general, the knit is a knitted fabric made by a series of work of making one or plural yarns into a loop, and hooking the next yarn to the loop, thereby making a new loop. In general, a knitted fabric made by a flat knitting machine refers to a knit article, and a knitted fabric made into a shape of yard goods by a circular knitting machine or a warp knitting machine refers to a jersey. In FIG. 7, an example of a flat knit fabric K1 among knitted articles made by knitting yarns S is schematically shown, and in FIG. 8, an example of a rib knit fabric K2 among the knitted articles made by knitting the yarns S is schematically shown.

In the case where the cloth of the present invention is the knit, yarn twists, each of which is formed of plural yarns, can be applied to the one or plural yarns themselves for use in the knit. Then, signal intensity and sensitivity in the sensing, a displacement in the actuation, and the like can be designed and adjusted in accordance with a ratio (density) of the conductive polymer fibers contained in the yarn twists.

The fibers in the cloth of the present invention refer to ones formed by slitting such as film cutting, as well as fibers spun by methods such as melt spinning, wet spinning and electrospinning, including the case where the fibers concerned are the conductive polymer fibers. With regard to a diameter and width of the fibers, approximately several microns to several hundred microns per fiber are preferable because of weaving easiness and knitting easiness in the case of forming the fabric and the knit, softness of the woven fabric and the knitted knit, handling easiness of the fabric and the knit as textures, and the like. Note that, among fibers in which a thickness is as large as measuring up to several millimeters, tubular fibers having similar functions to those in the present invention are observed. However, such a large-diameter product and products which share principles of the functions with the product concerned cannot be used for the knit and the fabric. In the sensor and the actuator, which are made of the fabric and knit of the present invention, the conductive polymer fibers as described above, of which diameter is as small as several microns to several hundred microns, are used. In such a way, the sensing function and the actuation function can be imparted even to the knit, the fabric, and the like, to which it has been difficult to apply the conventional large-diameter fibers. Naturally, in accordance with the cloth of the present invention, it is possible to realize the sensing and the actuation in such a small space where the fibers with a diameter of several millimeters cannot be used.

The fibers which come to have the above-described diameter and width also become easy to handle as fibers in such a manner that several ten to several thousand pieces thereof are bundled. An obtained bundle may be twisted. In the cloth of the present invention, the above-described fabric and knit are formed by using the fibers thus bundled.

Figure 10:
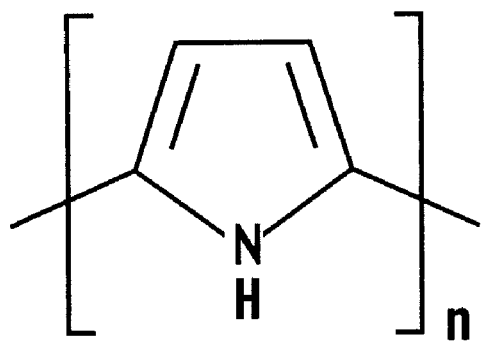
FIG. 10 is examples of chemical formulas of pyrrole conductive polymers.
Figure 10:
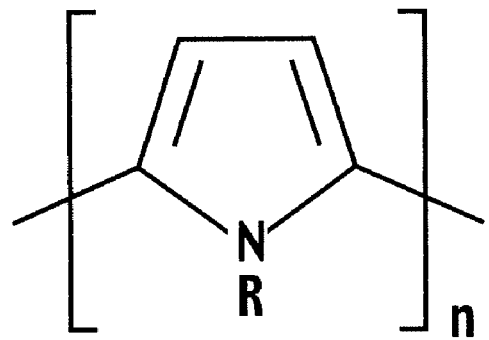
Figure 11:
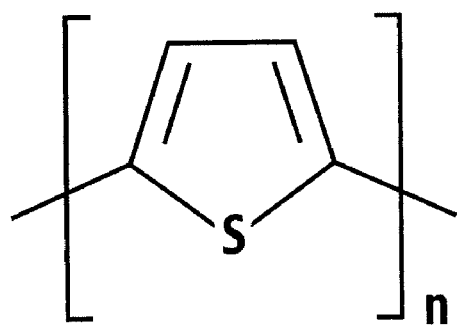
FIG. 11 is examples of chemical formulas of thiophene conductive polymers.
Figure 11:
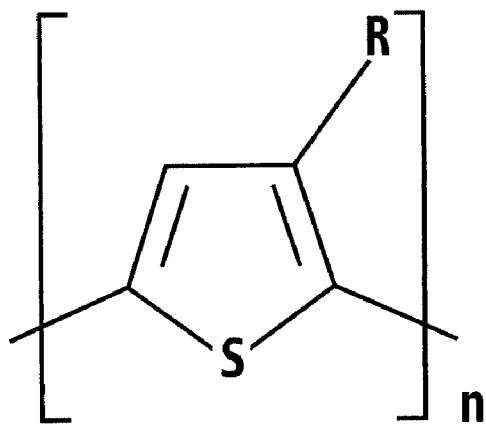
Figure 11:
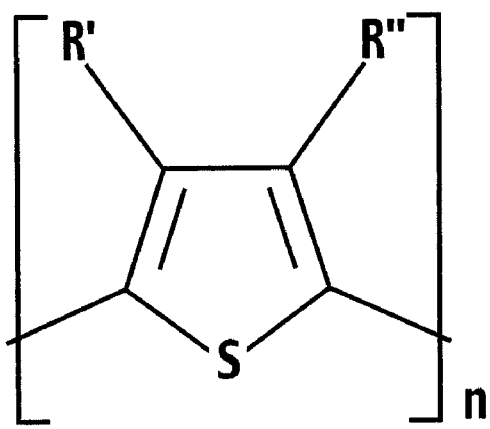
Figure 11:
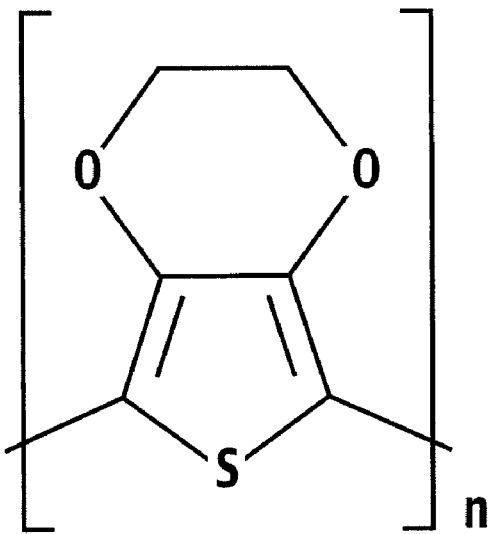
Figure 12:
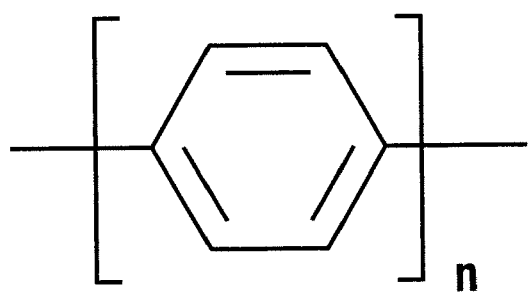
FIG. 12 is examples of chemical formulas of phenylene conductive polymers.
Figure 12:
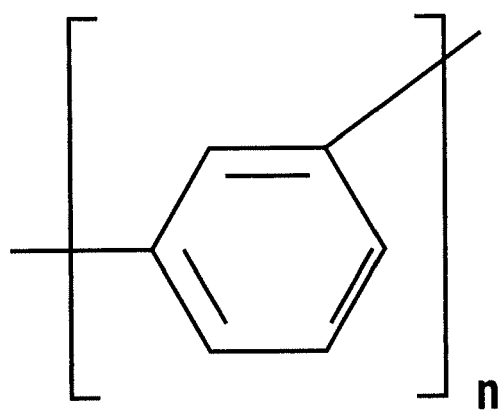
Figure 12:
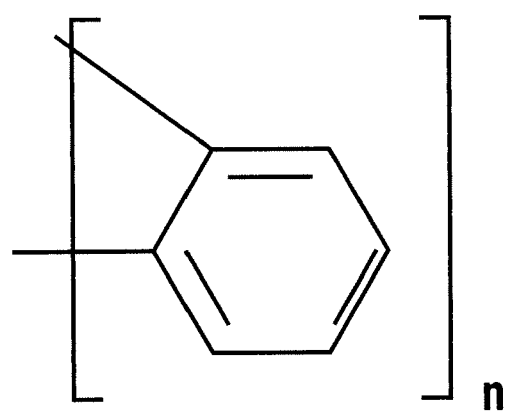
Figure 13:
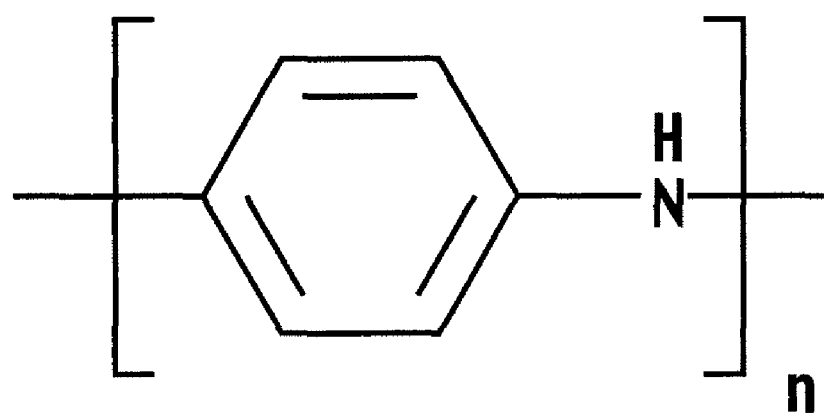
FIG. 13 is examples of chemical formulas of aniline conductive polymers.
Figure 13:
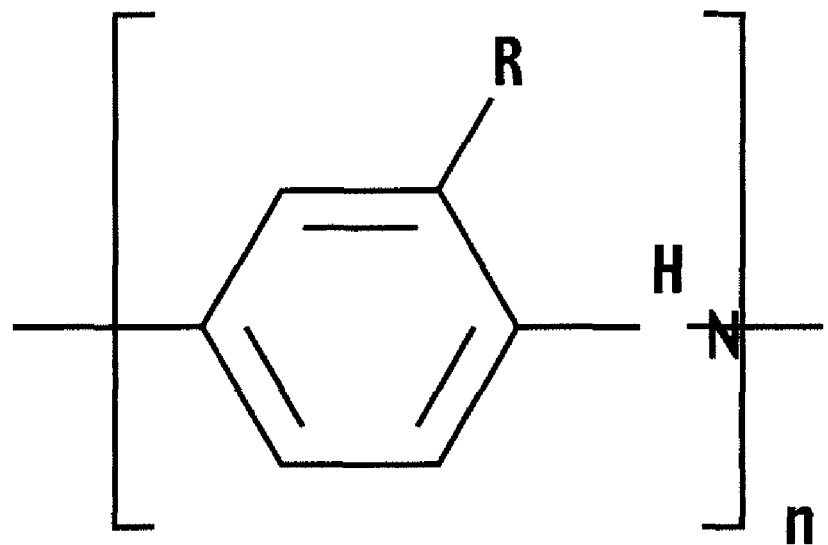

A conductive polymer as a material of the conductive polymer fibers for use in the present invention is not particularly limited as long as it exhibits conductivity. For example, there are mentioned: the respective conductive polymers of acetylene, conjugated five-membered ring, phenylene and aniline; and copolymers of these. As the conductive polymer of the conjugated five-membered ring, for example, there are used a pyrrole polymer and the like, which are obtained by polymerizing, as a monomer: 3-alkylpyrrole such as 3-methylpyrrole, 3-ethylpyrrole 3-dodecylpyrrole; 3,4-dialkylpyrrole such as 3,4-dimethylpyrrole and 3-methyl-4-dodecylpyrrole; N-alkylpyrrole such as N-methylpyrrole and N-dodecylpyrrole; N-alkyl-3-alkylpyrrole such as N-methyl-3-methylpyrrole and N-ethyl-3-dodecylpyrrole; 3-carboxypyrrole; and the like; as well as pyrrole. Moreover, a thiophene polymer, an isothianaphthene polymer, and the like are used. FIG. 9(a) to (e) show examples of chemical formulas of the acetylene conductive polymers. FIGS. 10(a) and (b) show examples of chemical formulas of the pyrrole conductive polymers. FIG. 11(a) to (d) show examples of chemical formulas of the thiophene conductive polymers. FIG. 12(a) to (c) show examples of chemical formulas of the phenylene conductive polymers. FIGS. 13(a) and (b) show examples of chemical formulas of the aniline conductive polymers.

Moreover, addition of a dopant to the conductive polymers brings up a dramatic effect to the conductivity thereof. As the dopant, there is used at least a type of polymer ions among polymer ions such as: halide ions such as chloride ions and bromide ions; phosphate ions such as perchlorate ions, tetrafluoroborate ions, hexafluoroarsenate ions, sulfate ions, nitrate ions, thiocyanate ions, hexafluorosilicate ions, phosphate ions, phenylphosphate ions and hexafluorophosphate ions; trifluoroacetate ions; tosylate ions; alkylbenzenesulfonate ions such as ethylbenzenesulfonate ions and dodecylbenzenesulfonate ions; alkylsulfonate ions such as methylsulfonate ions and ethylsulfonate ions; polyacrylate ions; polyvinylsulfonate ions; polystyrenesulfonate ions; and poly (2-acrylamide-2-methylpropanesulfonate) ions. Loadings of the dopant just need to be an amount by which the effect can be given to the conductivity, and are not particularly limited. However, in usual, the loadings of the dopant are within a range of 3 to 50 parts by mass, preferably 10 to 30 parts by mass, with respect to 100 parts by mass of the conductive polymer.

Figure 14:
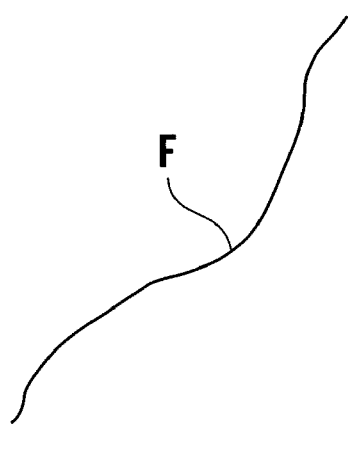
FIG. 14 is views explaining a fiber, a bundle of the fibers, and an example where contact points between the fibers are increased.
Figure 14:
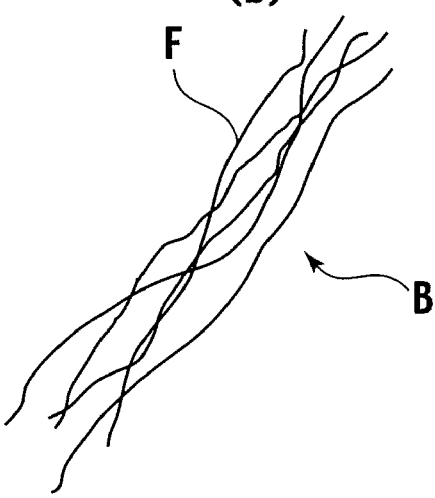
Figure 14:
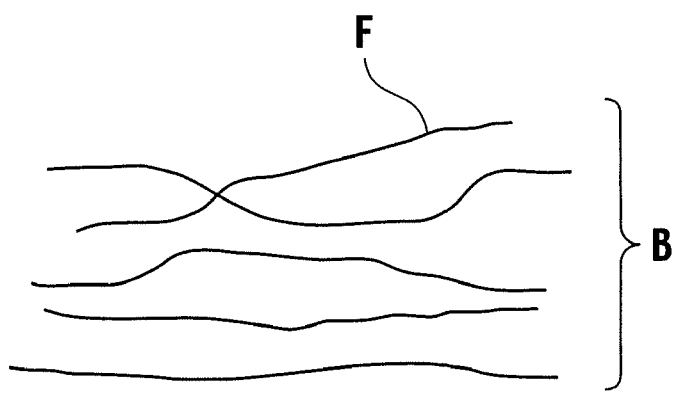
Figure 14:
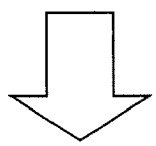
Figure 14:
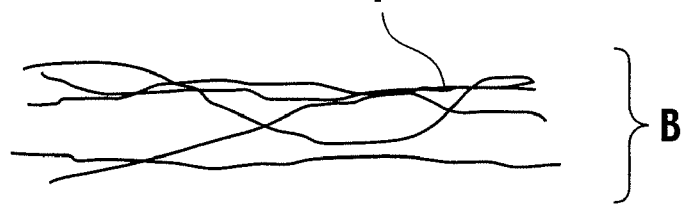

The cloth of the present invention includes the bundle of the conductive polymer fibers using the above-described materials. Accordingly, based on the principles such as an increase of contact points between the conductive polymer fibers owing to expansion/contraction and compressive deformation of the fibers concerned, which occur when force is applied to the fibers, a resistance value of the yarns in which the conductive polymer fibers are bundled is changed. In such a way, it becomes possible to sense the force and the deformation. A description will be made of the above by using FIG. 14(a) to (c). In the cloth of the present invention, a conductive polymer fiber F shown in FIG. 14(a) is bundled, and a bundle B of the conductive polymer fibers F, which is as schematically shown in FIG. 14(b), is formed. In FIG. 14(c), states before and after the force is applied to the bundle B are shown while being connected to each other by an arrow. As shown in FIG. 14(c), when the force such as tension and compression is applied to the bundle B, the conductive polymer fibers F composing the bundle B increase the contact points with the adjacent fibers. Hence, a resistance value of the entire bundle B is decreased. From this fact, it becomes possible to sense the force and the deformation.

Moreover, the fact that a conductive polymer material is deformed by electric stimulation is known by an electric deformation method of a material using a pyrrole polymer that expands and contracts by the electric stimulation, which is as described in Japanese Patent Laid-Open Publication No. H11-159443. As in the present invention, such a conductive polymer material is formed into fibers, then into a fabric or a knit. In such a way, in response to the electric stimulation added to the conductive polymer fibers, it is also possible to deform the fabric or the knit, and also possible to change a surface hardness and touch feeling of the fabric or the knit in a state where an outer circumference thereof is fixed.

A preferable range of conductivity of the conductive polymer fibers for obtaining the sensing and actuation functions as described above is usually 0.1 to 600 S/cm. It is preferable that the conductive polymer fibers have this degree of conductive polymer fibers from viewpoints of sensing performance and actuation performance. The reason for this is as follows. In the case of being formed into the fabric or the knit, the conductive polymer fibers work as resistors. In this case, if a resistance value of the conductive polymer fibers is too large, then a current for the actuation and the sensing becomes less likely to flow. Meanwhile, if the resistance value is too small, then power consumption is increased to thereby generate heat, and this is not preferable also from a viewpoint of energy saving. The range of the conductive polymer fibers of the conductive polymer fibers is more preferably 1 to 450 S/cm, particularly preferably 1 to 300 S/cm. In such a way, the sensing function and the actuation function can be revealed more efficiently. The conductivity mentioned here refers to an inverse number of a resistivity obtained in conformity with JIS K 7194 (testing method for resistivity of conductive plastics with a four-point probe array).

It is more preferable that the conductive polymer fibers for use in the cloth of the present invention be fibers containing at least one selected from the group consisting of polypyrrole, PEDOT (poly3,4-ethylenedioxythiophene)/poly4-styrenesulfonate (PSS), polyaniline, and polyparaphenylene vinylene (PPV) among conductive polymer materials exhibiting the above-described conductivity. Moreover, among the above-mentioned materials, as preferable materials which are likely to be obtained as the fibers, there are mentioned PEDOT/PSS (Baytron P (registered trademark), Bayer AG) in which poly4-styrenesulfonate PSS is doped into PEDOT as a thiophene conductive polymer, phenylene PPV, pyrrole poly pyrrole, and the like.

These preferable materials satisfy the above-mentions suitable conductivity. Moreover, among the conductive polymers, it is possible to easily form the materials concerned into the fibers by the method such as the wet spinning and the electrospinning. Accordingly, these preferable materials are preferable as the materials of the fibers.

For example, by the wet spinning, it is possible to produce the conductive polymer fibers of the thiophene, the pyrrole and the aniline. For example, a water dispersion (Baytron P (registered trademark), Bayer AG) of PEDOT/PSS is extruded from a cylinder into acetone, whereby the conductive polymer fibers can be obtained with ease. This wet spinning will be described by using FIG. 15.

Figure 15:
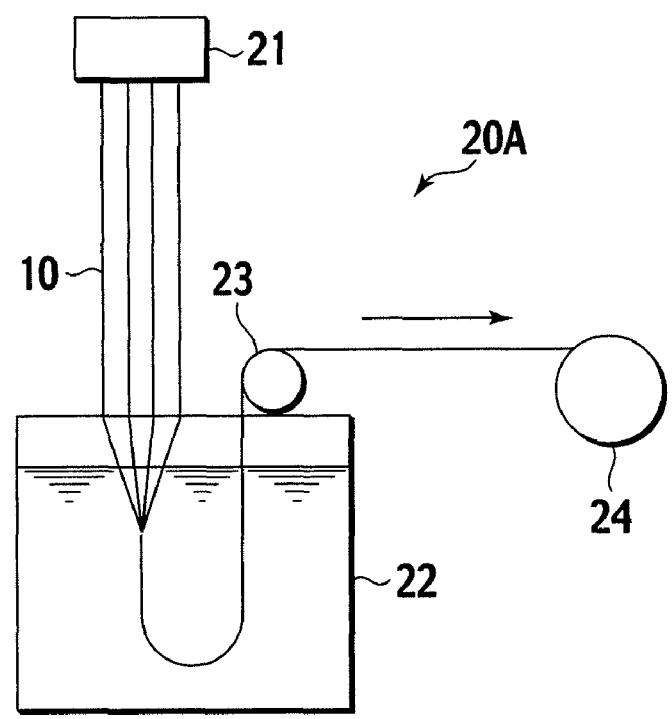
FIG. 15 is a schematic view of a wet spinning machine.

FIG. 15 is a schematic view of a wet spinning machine according to the present invention. A wet spinning machine 20A shown in FIG. 15 includes: a wet spinning mouthpiece 21 attached onto a spinning assembly into which the raw material is introduced; a wet spinning solvent bath 22 that houses such a solvent therein and receives a precursor of the fibers, which is extruded from the wet spinning mouthpiece 21; a fiber feeder 23 that guides the fibers obtained by passing through the wet spinning solvent bath 22; and a fiber spool 24 that spools the fibers guided by the fiber feeder 23. This wet spinning machine 20A is used, whereby the conductive polymer fibers are obtained. For example, the water dispersion of PEDOT/PSS (Baytron P (registered trademark), Bayer AG) is extruded from the wet spinning mouthpiece 21, and the extruded precursor 10 of the fibers is made to pass through the wet spinning solvent bath 22 that contains the solvent such as acetone. Then, the precursor 10 is made to pass through the fiber feeder 23, and is then spooled by the fiber spool 24.

Meanwhile, the phenylene conductive polymer fibers are specifically those of polyparaphenylene, polyparaphenylene vinylene, polyfluorene, and the like. The phenylene conductive polymer fibers are conductive polymer fibers of a type that makes electric conduction by using n bonding on a benzene ring and n bonding on a straight chain connected thereto. It is possible to form these conductive polymer fibers into fibers by the electrospinning method. This electrospinning method will be described by using FIG. 16.

Figure 16:
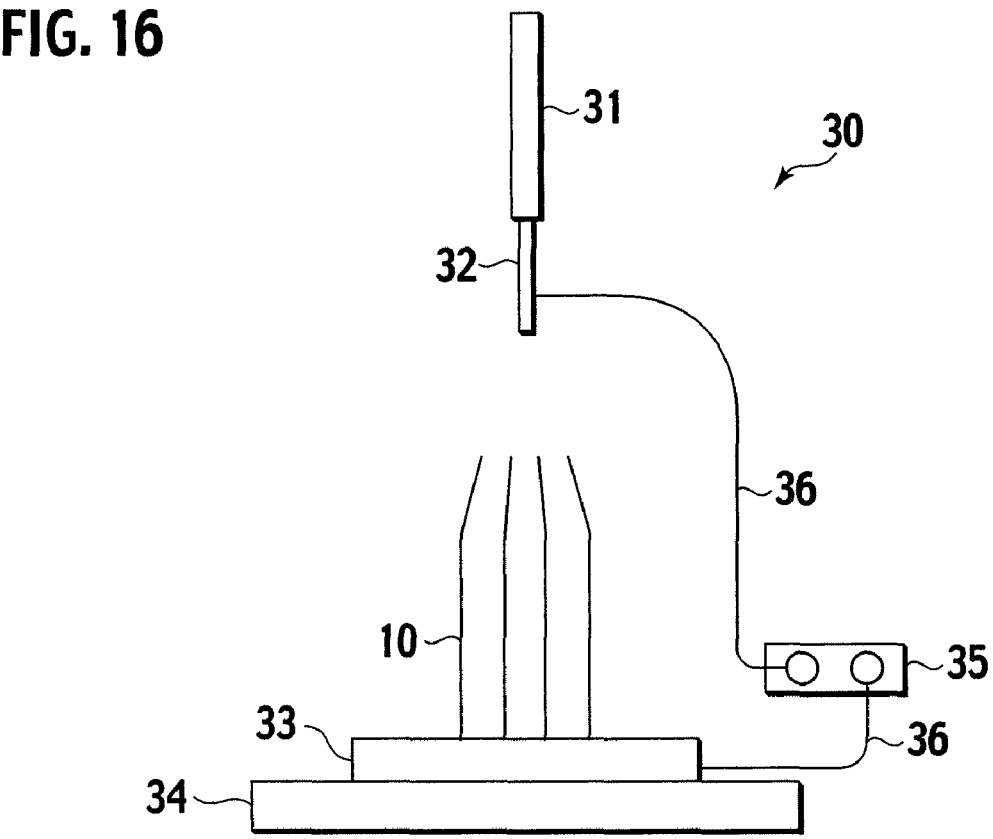
FIG. 16 is a schematic view of an electrospinning machine.

FIG. 16 is a schematic view of an electrospinning machine for producing the conductive polymer fibers according to the present invention. In an electrospinning machine 30 shown in FIG. 16, a cylinder needle 32 is attached onto a tip end of a cylinder 31, in which the raw material is housed, while communicating therewith, and moreover, an electrode 33 is mounted on an insulating material (base) 34 placed below the cylinder 31. A voltage application device 35 is provided between the cylinder needle 32 and the electrode 33, while individually interposing electric wires 36 therebetween, so as to be capable of applying a voltage between a needle tip of the cylinder needle 32 and the electrode 33. Here, the electric wires 36 are individually connected to the cylinder needle 32 and the electrode 33. In the case of producing the conductive polymer fibers by using the electrospinning machine 30, for example, a phenylene material such as polyparaphenylene and alcohol such as methanol are mixed together, whereby a spinning liquid as a raw material is prepared. The prepared spinning liquid as the raw material is housed in the cylinder 31. The prepared spinning liquid is extruded from the needle tip of the cylinder needle 32 of the cylinder 31 toward the electrode 33 while applying the voltage between the cylinder 31 and the electrode 33. In such a way, the fiber precursors 10 are precipitated on the electrode 33. The obtained fiber precursors are dried by a publicly known method such as vacuum drying, whereby the conductive polymer fibers are obtained.

By adopting the production methods in accordance with the wet spinning and the electrospinning, which are as described above, it becomes possible to easily produce the conductive polymer fibers which form the fabric or the knit.

Next, it is also preferable that the fabric or the knit, which includes such conductive polymer fibers, be coated with other polymers. The fabric or the knit is fabricated from the conductive polymer fibers, and is then coated with the other polymers, whereby it is possible to enhance strength and durability of the fabric or the knit, and in addition, it is possible to bring up a stable sensing behavior and actuation behavior. This is the reason for the above. It is possible to set a coated amount of the other polymers arbitrarily within a range of not hindering the performance of the above-described sensing or actuation. However, a ratio of a cross-sectional area of such a coating material with respect to a cross-sectional area of the conductive polymer fibers is set at preferably 10 to 80%, more preferably 30 to 50%.

Figure 17:
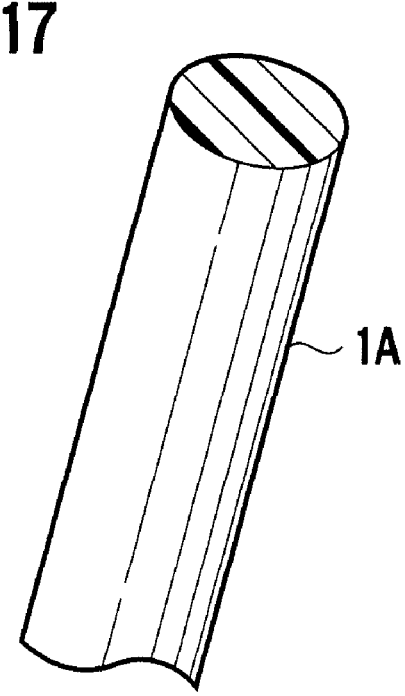
FIG. 17 is a schematic view showing a shape example of a fiber made of a single component.
Figure 18:
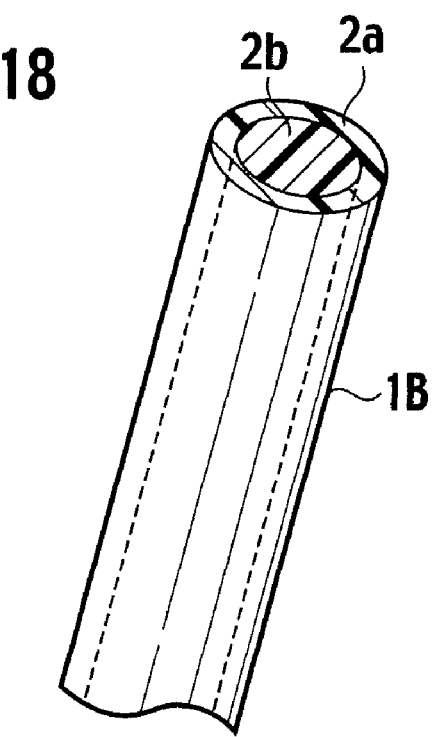
FIG. 18 is a schematic view showing a shape example of a core-sheath fiber.
Figure 19:
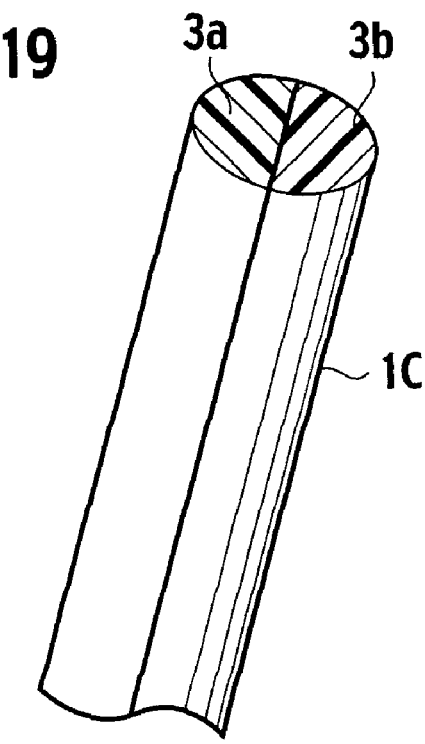
FIG. 19 is a schematic view showing a shape example of a side-by-side fiber.
Figure 20:
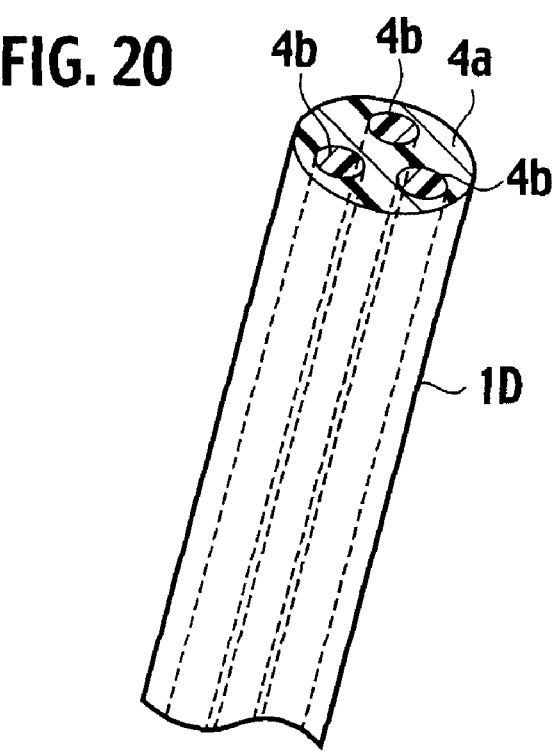
FIG. 20 is a schematic view showing a shape example of a sea-island fiber.
Figure 21:
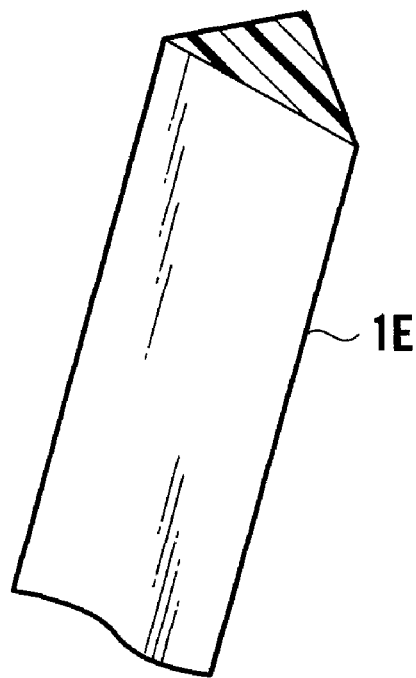
FIG. 21 is a schematic view showing a shape example of an odd (triangle)-cross-section fiber.
Figure 22:
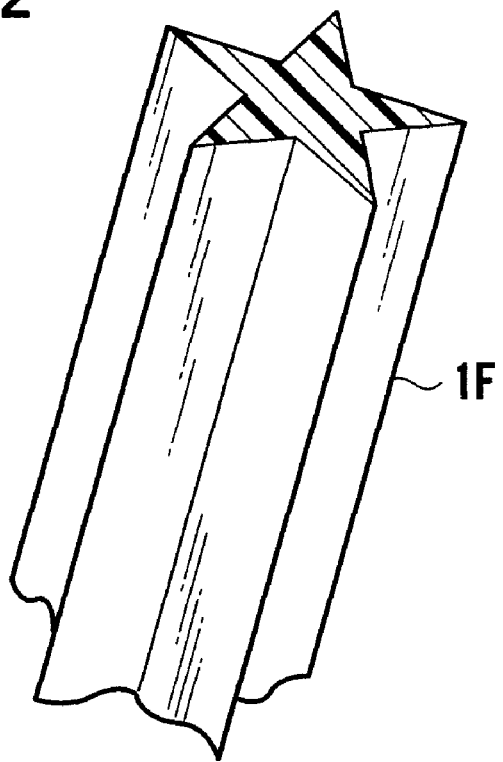
FIG. 22 is a schematic view showing a shape example of an odd (star)-cross-section fiber.
Figure 23:
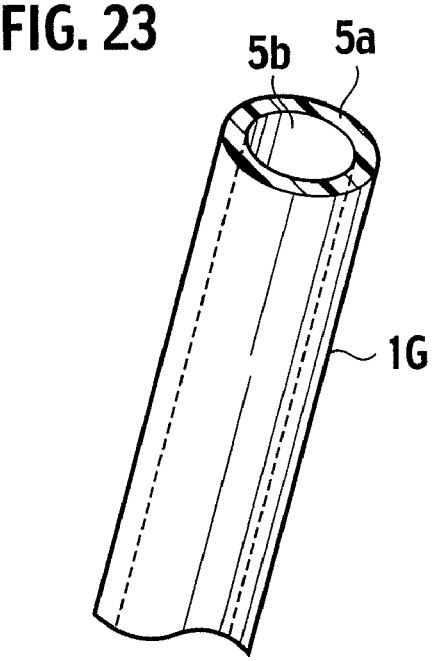
FIG. 23 is a schematic view showing a shape example of a hollow fiber.

As means for enhancing the strength and durability of the above-described fabric or knit and bringing up the stable sensing behavior and actuation behavior, the conductive polymer fibers are combined with the other polymers at a stage of obtaining the conductive polymer fibers or at a stage before the weaving or the knitting after the production of the conductive polymer fibers, whereby the fibers for use in the weaving or the knitting are made to have cross-sectional shapes which are core-sheath, side-by-side and sea-island. Such means is also preferable. Besides a fiber material as shown in FIG. 17, which is made of one uniform material and has a fiber 1A circular in cross section, the following materials are mentioned as general fiber materials: a material as shown in FIG. 18, in which a fiber 1B has such a core-sheath structure in which a sheath portion 2a and a core portion 2b are made of different materials when a cross section of the fiber 1B is viewed; a material as shown in FIG. 19, in which a fiber 10 has such a side-by-side structure in which different materials 3a and 3b are adjacent to each other when a cross section of the fiber 1C is viewed; and a material as shown in FIG. 20, in which a fiber 1D has such a sea-island (multicore) structure in which island portions 4b formed of a material different from that of a sea portion 4a are formed in the sea portion 4a when a cross section of the fiber 1D is viewed. Besides the above, materials in which cross sections are not circular but transformed are further mentioned. For example, there are mentioned: a material as shown in FIG. 21, in which a fiber 1E has a triangular cross-sectional shape; a material as shown in FIG. 22, in which a fiber 1F has a star-like cross-sectional shape; a hollow-structured material as shown in FIG. 23, in which a fiber 1G is made of a tubular material 5a, and a hollow portion 5b is formed; and the like. As one of means for functionalizing the fibers, the shapes mentioned above are used for changing feeling of the fibers by giving a naturally twisted shape thereto, for achieving weight reduction and heat insulation by increasing a surface area of the fibers, and the like.

Figure 24:
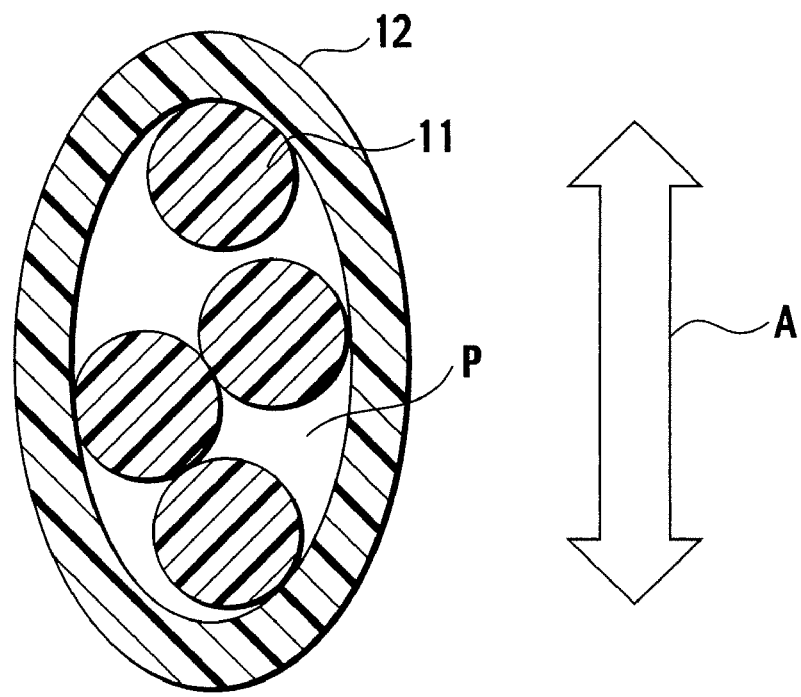
FIG. 24 is a schematic cross-sectional view of a fiber in which anisotropy is given to sensing performance.
Figure 25:
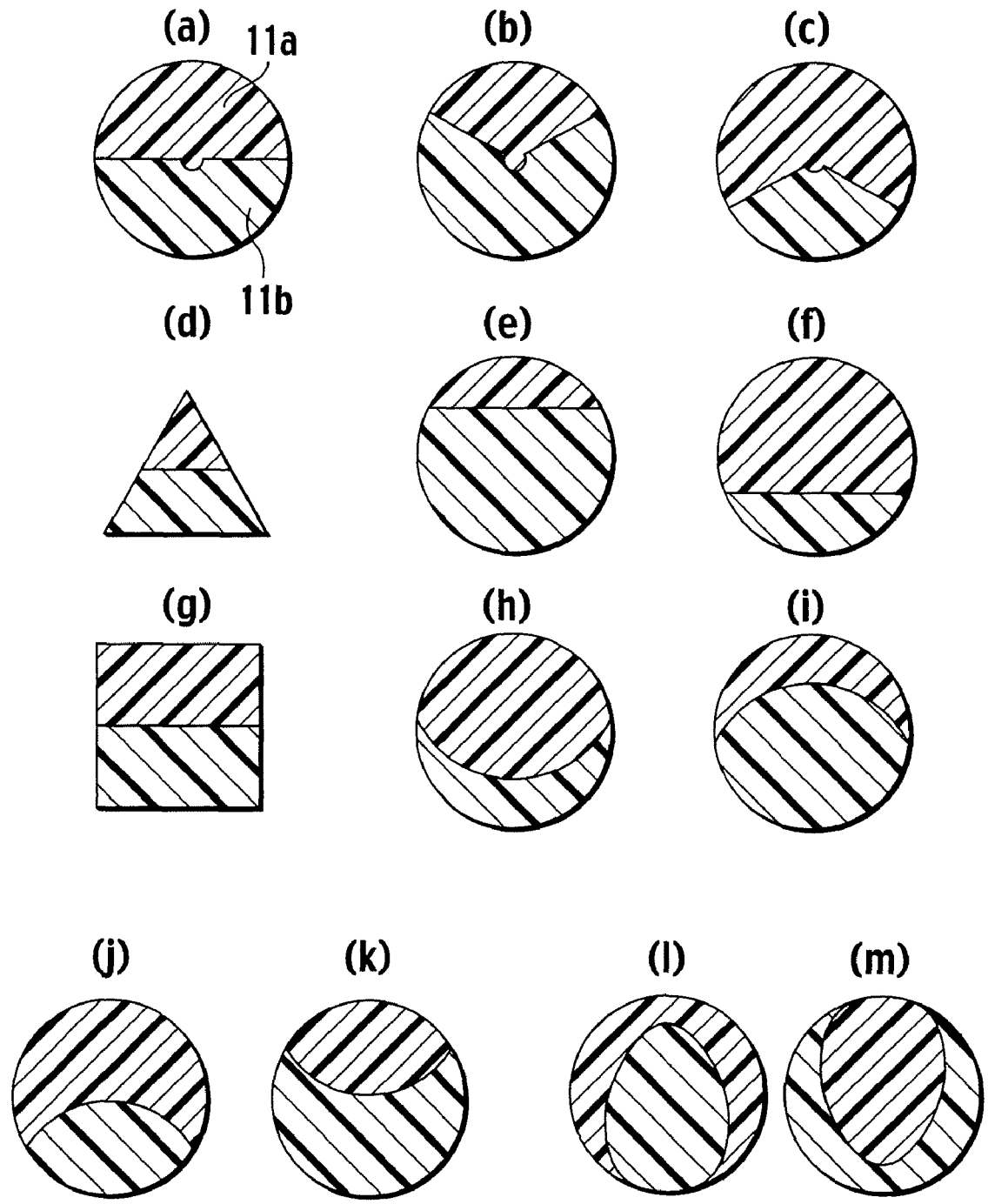
FIG. 25 is schematic cross-sectional views showing cross-sectional shapes of conductive polymer fibers, in each of which a part of a surface layer is formed of a different material.

Also in the conductive polymer fibers for use in the cloth of the present invention, contrivance can be made for such a structure of the cross-sectional shape as in the general fibers. However, the structure of the cross-sectional shape of the fibers in the present invention is to be constructed not only for changing static characteristics such as the feeling, the weight reduction and the heat insulation in the general fibers but also for achieving the enhancement of the functions such as the sensing and the actuation. Specifically, in the cloth of the present invention, an intention in the case of making the contrivance for the structure of the cross-sectional shape is to realize the enhancement of the above-described functions by combining contrivance for the fiber structure and contrivance for the material. Hence, for example, in order to enhance the sensing function from a desired specific direction, the other materials are selectively coated on the surfaces of the conductive polymer fibers, or the plurality of conductive polymer fibers are stacked in a specific direction, whereby a deformation direction thereof is limited. The conductive polymer fibers are stacked in the specific direction, whereby there occurs a surface in which a motion of the fibers is hindered. In such a way, when viewed macroscopically in terms of the fiber shape, the conductive polymer fibers will have directivity in the sensing and/or the actuation with respect to a certain direction. For example, in a fiber of which cross section is shown in FIG. 24, a plurality of polymer fibers 11 are covered with another resin 12 so as to be arrayed in a specific direction. In such a fiber, the sensing function is revealed to a larger extent in a direction where the polymer fibers 11 are arrayed, that is, in a direction shown by an arrow A in the drawing. In such a way, the functions can be enhanced.

Moreover, a part or the entirety of the surface of each conductive polymer fiber is combined in advance with the other polymer, whereby such a structure can be made, which has a cross-section of the core-sheath type, the side-by-side type, or the like, which is described above. By adopting the cross-sectional structure as described above, the contact portions between the adjacent fibers can be controlled, and the strength of the fiber itself can be enhanced. A part of the surface of the conductive polymer fiber, which is mentioned here, stands for a state where such another material does not cover the entire surface of the conductive polymer when the other material is formed on the surface of the fiber member having each conductive polymer as a core, and a stacked body is thereby formed. As a typical example of the fiber in which a part of the surface of the conductive polymer fiber is combined with the other polymer, there is a fiber having a cross section of the side-by-side type. As cross-sectional shapes when the conductive polymer fiber and the other polymer are stacked, there are mentioned a semicircle, a sector, a shape sectioned by a chord, and a crescent for these materials 11a and 11b different from each other, for example, as shown in FIGS. 25(a) to 25(m).

In each of the cross-sectional shapes shown in FIGS. 25(a) to 25(m), it is represented by different hatchings that the materials are different from each other. Regardless of sizes of material areas, the functions of each fiber can be revealed if one of the two materials is the conductive polymer, the other is the other polymer, and both of them are combined together.

Among the fibers in which the stack structures are of the side-by-side type, fibers are suitable, in each of which each cross-sectional area of the portion of the conductive polymer having the conductive functions and the portion of the other polymer serving as a restraint layer is approximately 50%. By setting the cross-sectional areas as described above, in particular, the strength of each fiber itself as the fiber imparted with the actuation and sensing functions by the conductive polymer is also enhanced by the other polymer, as well as the actuation and sensing functions are obtained. In order to obtain the fibers with these stack structures, a spinning machine as shown in FIG. 26 can be used, in which a device of continuously coating such resin layers stacked on the fibers is provided, for example, in a process of the wet spinning.

Figure 26:
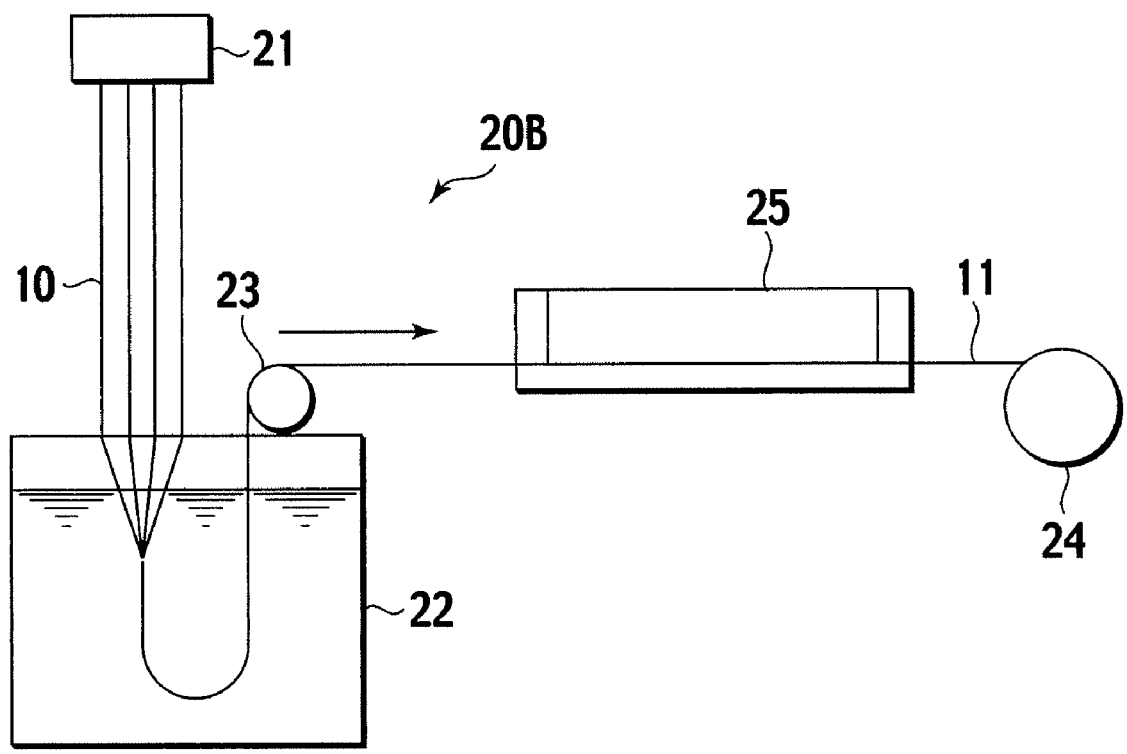
FIG. 26 is a schematic view of an apparatus in which a coating step is provided in the wet spinning machine.
Figure 27:
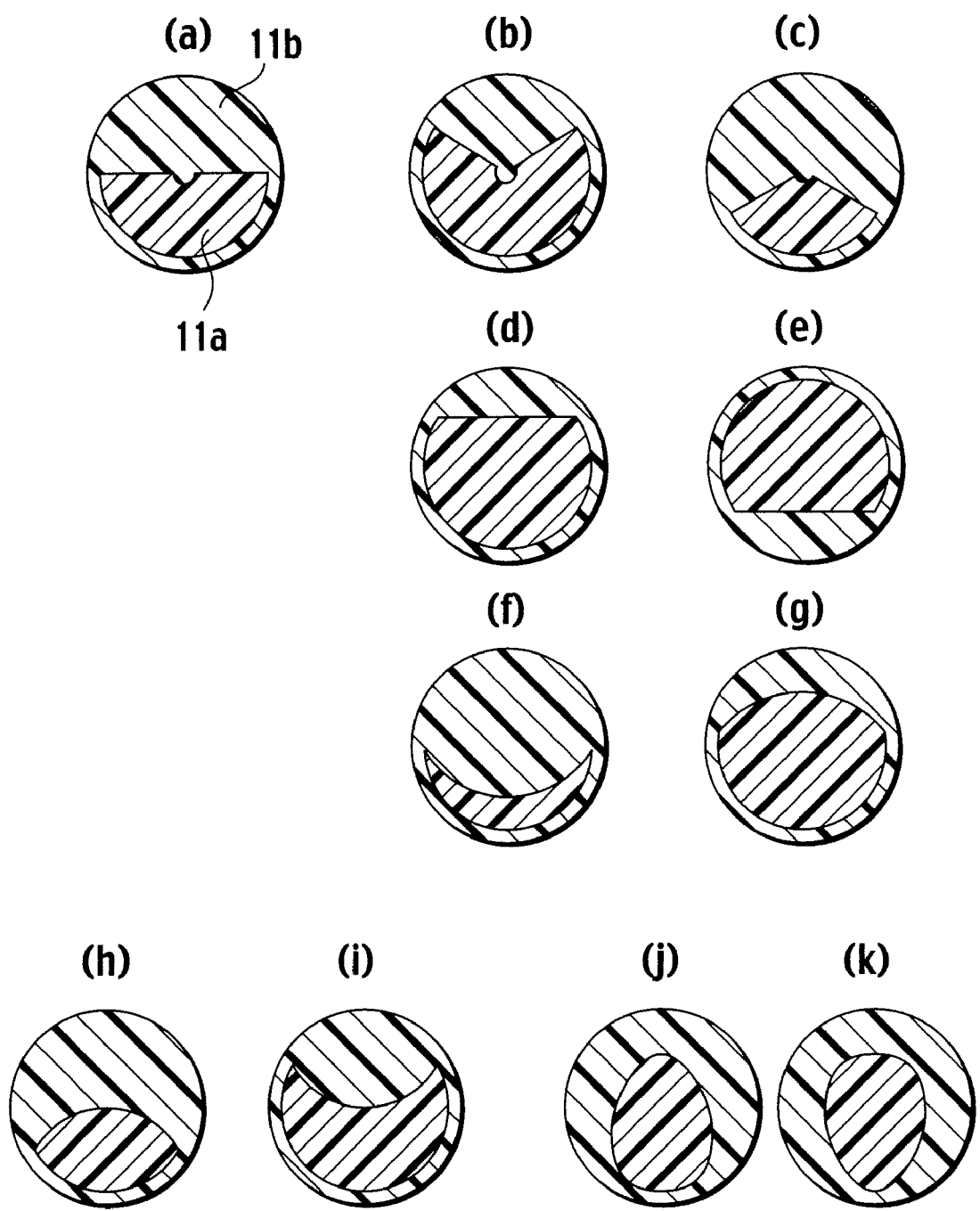
FIG. 27 is schematic cross-sectional views showing cross-sectional shapes of conductive polymer fibers, in each of which a part of an inner diameter cross section is formed of a different material.
Figure 28:
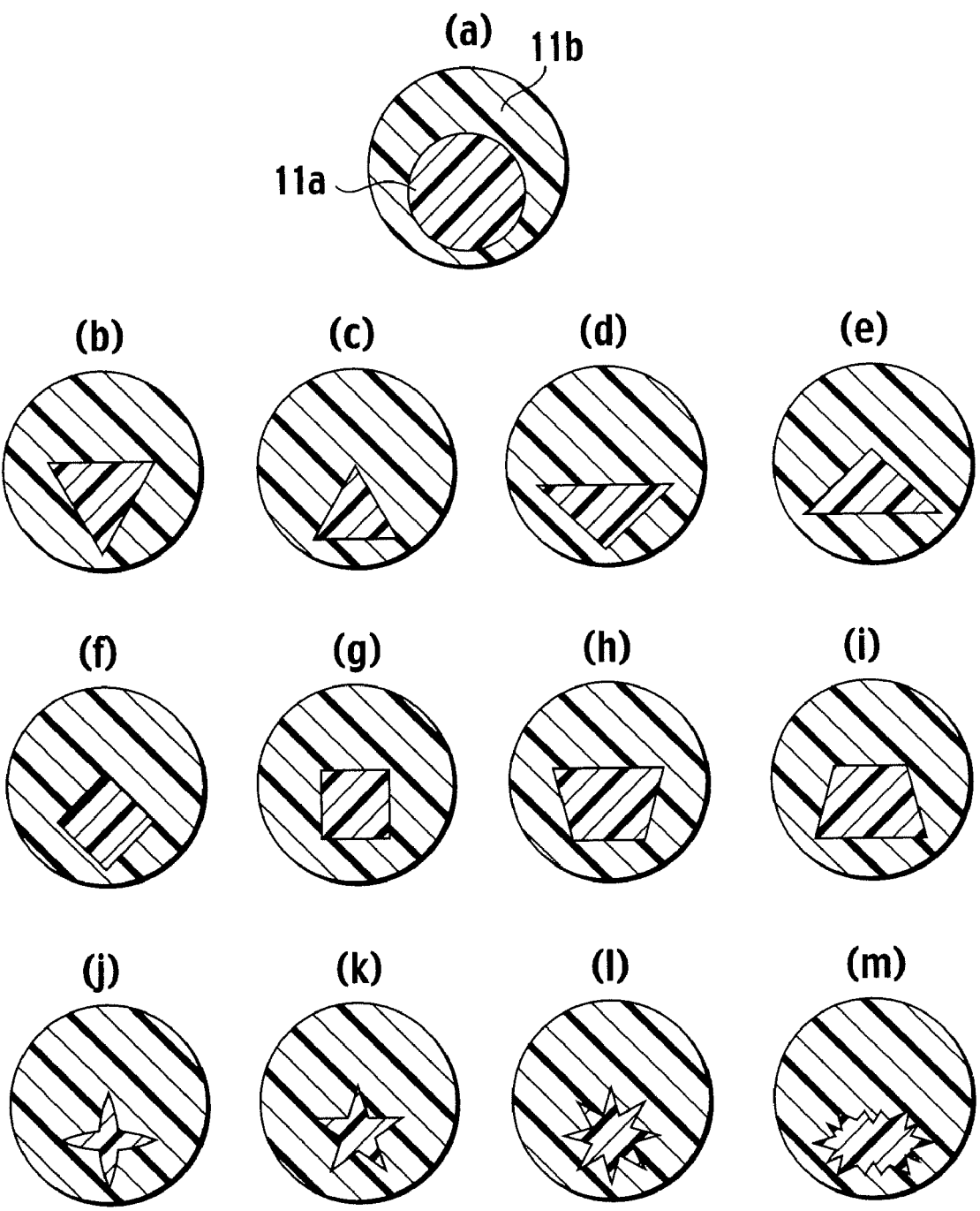
FIG. 28 is schematic cross-sectional views showing cross-sectional shapes of conductive polymer fibers, in each of which a part of an inner diameter cross section is formed of a different material.
Figure 29:
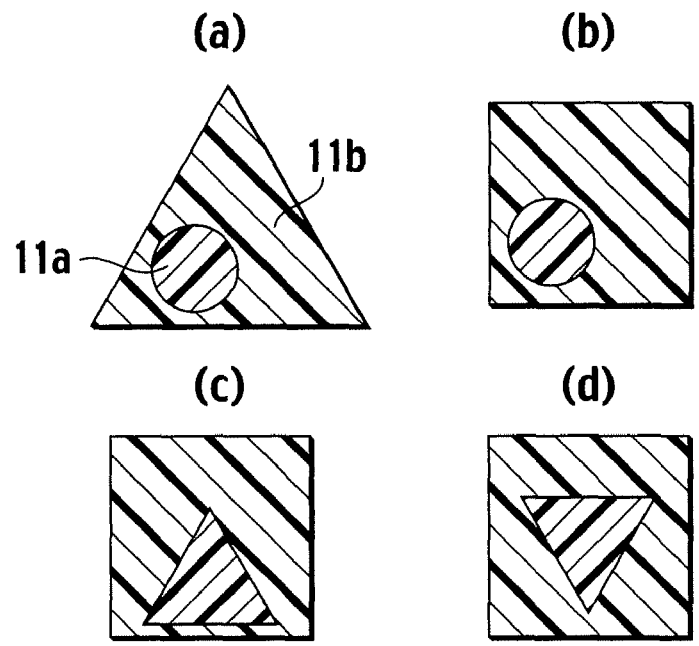
FIG. 29 is schematic cross-sectional views showing cross-sectional shapes of conductive polymers, in each of which a part of an inner diameter cross section is formed of a different material.

FIG. 26 is a schematic view of an apparatus in which a coating device is provided in the wet spinning machine according to the present invention. Note that, in FIG. 26, the same reference numerals are assigned to the same members as the members composing the wet spinning apparatus shown in FIG. 15, and a duplicate description will be omitted below. A wet spinning machine 20B shown in FIG. 26 includes a coating/drying device 25 that coats the other polymer on the surface of each fiber having passed through the wet spinning solvent bath 22, followed by drying. In this wet spinning machine 20B, such a spinning raw liquid is extruded from the wet spinning mouthpiece 21, and the extruded fiber precursor 10 is made to pass through the wet spinning solvent bath 22 that contains the solvent such as acetone. After passing through the solvent bath 22 concerned, the precursor 10 passes through the fiber feeder 23, and is coated with the resin material and the like by the coating/drying device 25, followed by drying. Thereafter, the fiber 11 is obtained, and is spooled by the fiber spool 24. By the coating/drying step by the coating/drying device 25 of the wet spinning machine 20B, a stacked fiber in which material species different from the material of the conductive fiber are partially coated on the surface of the conductive fiber is formed. In such a way, the conductive polymer fiber for use in the present invention can be obtained.

Besides those having the cross-sectional structure of the side-by-side type, it is possible to use even a fiber having the cross-sectional structure of the core-sheath type, in which a material different from that of the other portion is made to penetrate a part of the cross section of the fiber, as the conductive polymer fiber of the present invention. The cross-sectional structure mentioned here, in which the material different from that of the other portion is made to penetrate a part of the cross section of the fiber, refers to the following structure as shown in FIGS. 27(a) to 27(K), FIGS. 28(a) to 28(m), and FIGS. 29(a) to 29(d). In this structure, in the case of viewing the cross section of the fiber, with regard to the materials 11a and 11b different from each other, either of the conductive polymer material serving as the portion having the driving (actuation) and sensing functions and the other polymer material that does not have the actuation or sensing function covers the entire surface of the fiber, and the portion that does not cover the surface is included in the core portion of the cross section. The fiber is formed into the shape of the cross-sectional structure of this core-sheath type, whereby the durability of the surface of the fiber itself depends on the durability of the other material on the sheath portion, for example, in the case of using the conductive polymer material for the core portion. Then, a general resin material such as elastomer is used for the sheath portion, whereby the durability of the surface of the fiber itself is enhanced in general.

Meanwhile, in particular, in the case of using the conductive polymer material for the sheath portion, the portion of the conductive polymer material appears on the surface of the fiber, and hence, contact on the contact points can be obtained easily in the case of using the fiber while conducting a current therethrough.

In the structure of the core-sheath type, it is preferable that both of area ratios of the core and the sheath on the cross-sectional area be approximately 50%. In the case of considering the strength of the fiber of the core-sheath type and a balance thereof with the driving and the sensing, these characteristics and performance can be revealed with the best balance when both of the area ratios of the core and the sheath are 50%.

Moreover, the core is not limited to one piece in the fiber of the core-sheath type. Even if the fiber has a multicore structure, that is, the sea-island structure, a similar effect is obtained.

Such a core-sheath conductive polymer fiber can be produced by coating a coating material, which contains nonconductive polymer resin as a main component, as the sheath portion by continuous steps on the conductive fiber of the core portion obtained, for example, by the wet spinning or electric field polymerization. The step of coating the coating material can be performed, for example, by an apparatus shown in FIG. 30.

Figure 30:
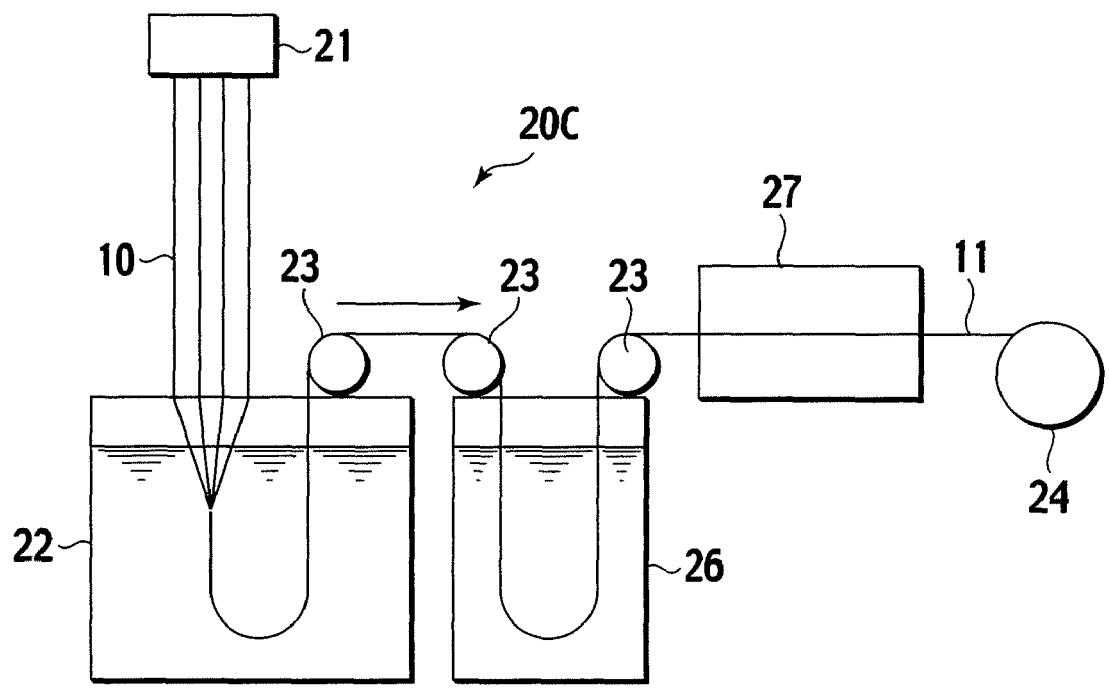
FIG. 30 is a schematic view of an apparatus in which a coating step is provided in the wet spinning machine.

FIG. 30 is a schematic view of a spinning machine in which a coating device that performs the coating step is provided in the wet spinning machine according to the present invention. In FIG. 30, the same reference numerals are assigned to the members shown in FIG. 15 and FIG. 26, and a duplicate description will be omitted below. A wet spinning machine 20C shown in FIG. 30 includes: a coating bath 26 that coats the other polymer on the surface of the fiber having passed through the wet spinning solvent bath 22 so that the surface concerned can be covered with the other polymer; and a coating/drying device 27 that dries the fiber having passed through the coating layer 26. In the wet spinning machine 20C shown in FIG. 30, the spinning raw liquid is extruded from the wet spinning mouthpiece 21, and the extruded fiber precursor 10 is made to pass through the wet spinning solvent bath 22 that contains the solvent such as acetone. After passing through the solvent bath 22 concerned, the precursor 10 passes through the fiber feeder 23, and is fed to the coating bath 26 that contains a polyester emulsion and the like. The fiber immersed in the coating bath 26 and coated with the emulsion concerned is fed by the fiber feeder 23 to the drying device 27, followed by drying. Thereafter, the fiber 11 is spooled by the fiber spool 24.

By adjusting time/temperature of the drying step in the drying device 27, it is possible to adjust an amount of the resin left on the surface of the conductive fiber. Hence, fibers with different cross-sectional shapes can be obtained in accordance with a variety of drying conditions.

Moreover, as another method of producing the core-sheath conductive polymer fiber, an ejection mouthpiece for the core-sheath type is used in the case of the wet spinning, and the fiber precursor of the core-sheath type is extruded by the ejection mouthpiece, thus also making it possible to fabricate the core-sheath fiber by a single drawing operation from the solvent bath.

As the cross-sectional shapes of the fibers having the cross-sectional structures such as the core-sheath type and the side-by-side type, each of which is obtained in such a manner that a part or the entirety of the surface of the conductive polymer fiber is combined with the other polymer, shapes other than the circle can be adopted. For example, as odd cross-sections in terms of fiber forms, a flat cross section, a hollow cross section, a triangular cross section, a Y-shaped cross section, and the like can be adopted. Moreover, as the fiber forms, fiber forms having minute irregularities and streaks on the surface of the fiber, and the like can be adopted. In FIGS. 25(a) and 25(g) and FIGS. 29(a) to 29(d), fiber forms with triangular and quadrangular cross-sectional shapes are shown as the odd cross-sectional shapes.

In these composite conductive polymer fibers of the side-by-side type and the core-sheath type, it is preferable that the resin material be used for the material composing a part or the entirety of the surface layer of such a side-by-side fiber and the core portion or sheath portion of such a core-sheath fiber, and further, that the resin material concerned be thermoplastic resin. This is because, since the polymer material is mainly used as the conductive portion, the polymer material concerned is combined with the resin material having similar characteristics to those of the conductive material, thus making it possible to maintain the fiber shape while preventing, to the maximum extent, the motion of the conductive polymer from being hindered. Moreover, the thermoplastic resin is used as the resin material, whereby, in the case of producing and using the cloth woven or knitted from the conductive polymer fiber, it becomes possible to use the cloth while forming the cloth into a desired shape with ease.

As the resin combined with the conductive material and used for the coated portion, stacked portion, core-sheath portion or sea-island portion of the composite fiber, for example, there can be used: polyamide such as Nylon 6 and Nylon 66; polyethylene terephthalate; polyethylene terephthalate containing a copolymer component; polybutylene terephthalate; polyacrylonitrile; and the like. These resins can be used singly or by being mixed with the others. Moreover, besides these, it is preferable that the above-described resin be made of the elastomer. By using the elastomer, the deformation or recovery of the fiber is prevented more from being hindered than by the above-described polymer. As appropriate elastomer, it is suitable to use polysiloxanes in terms of obtaining large deformation. Besides this, polymethacrylate, polychloroacrylate or polystyrene derivatives, which exist in a glass state at room temperature, can be used. Moreover, as preferable elastomer that exists in a liquid crystal state at the room temperature, those containing polyacrylate, polysiloxanes or polyphosphazene, and copolymers composed of these are mentioned. As a preferable mesogenic group of the elastomer, there are mentioned those containing alkyl, alkoxy and oxaalkyl groups, each of which has, for example, up to fifteen chain members on a major axis of a mesogenic unit. In a similar way to usual synthesis of the polymer, the elastomer is synthesized, for example, by simple random copolymerization or a random polymer analogue addition reaction with molecules of a multifunctional crosslinking agent.

It is preferable that the other polymer for use in the coated portion, stacked portion, core-sheath portion or sea-island portion of the composite fiber form a porous body. The porous body is used for these portions, whereby adsorption and desorption of water molecules are facilitated. The adsorption and desorption of the water molecules are a mechanism of electric stimulation deformation of the conductive polymer, which is as described in the electric deformation method of the material using the pyrrole polymer that responds to the electric stimulation in Japanese Patent Laid-Open Publication No. H11-159443. In such a way, an actuation amount of the fiber and a response speed thereof to the sensing can be enhanced. Larger porosity of the porous body is preferable. However, the porosity of the porous body is preferably 30 to 70% from a viewpoint of actually enabling an increase of the response speed and enhancing the strength or durability of the composite fiber formed as the porous body.

(Sensor)

The cloth of the present invention can be used as a pressure sensor by being combined with current value and/or resistance value detecting means for measuring a current value and/or resistance value of the conductive polymer fibers of the cloth concerned. In the case where the cloth is applied to the sensor, it is preferable that, on the cloth, terminals connected to the current value and/or resistance value detecting means be arranged for each of the regions where the current value and/or resistance value of the cloth are detected. Specifically, in the case where the cloth is the fabric, the terminals are provided so as to include a region, to which a pressure in the cloth is applied, between the terminals on a certain warp yarn or weft yarn. The detecting terminals are arranged as described above, whereby the sensing can be performed efficiently. It is preferable that the detecting terminals be attached onto one bundle in which the plurality of fibers are bundled.

(Actuator)

The cloth of the present invention can be used as an actuator by being combined with voltage applying means for applying a voltage to the conductive polymer fibers of the cloth. In the actuator of the present invention, it is preferable that, on the cloth, terminals connected to the voltage applying means and the like be arranged for each of the regions where the expansion/contraction of the cloth is detected, or for each of the regions where the detection and driving are performed. Specifically, in the case where the cloth is the fabric, the terminals are provided so as to include a region, for which the driving in the cloth is to be performed, between the terminals on a certain warp yarn or weft yarn. The driving terminals are arranged as described above, whereby the cloth can be allowed to perform the actuation efficiently. Moreover, the detection and driving terminals are arranged, whereby the cloth can be allowed to perform the actuation based on the sensing. In this case, for example, the detecting terminals are attached onto one bundle, and the driving terminals are attached onto a bundle that is directly adjacent or in the vicinity of the one bundle and is arrayed in the same direction, whereby the detection and the driving can be performed.

(Vehicular Component)

Like the sensor using the cloth of the present invention and the actuator using the cloth of the present invention, the fabric and the knit, which include the conductive polymer fibers according to the present invention, are substituted for the existing fiber material for use in a vehicle. In such a way, the fiber and the knit are used for means for transmitting information by a vibration signal from the vehicle to a passenger, and for means for improving a riding comfort by detecting the motion of the fibers and driving the fibers based on the detected data. The above-described use of the fabric and the knit is suitable.

In an example of using the cloth according to the present invention for a seat, it becomes possible to measure a pressure of a seat surface by the cloth. Moreover, by the cloth, it becomes possible to transmit vibrations to the passenger. By such a measurement of the pressure of the seat surface, a posture, weight and the like of the passenger are sensed, and an appropriate arithmetic operation is performed based on data signals of these posture, weight and the like. Then, a signal for driving the cloth is outputted, and a feedback control is performed for the cloth as the actuator. In such a way, the cloth of the present invention can be used for improving the riding comfort, setting an activation position of an airbag or the like, and so on.

Moreover, the cloth according to the present invention is used for the actuation function as a main function, thereby can also be used as information transmitting means to a driver or the passenger from the seat, a steering wheel, a shift knob, an interior wall surface, and the like.

Besides these applications to the vehicle, it is also possible to apply the cloth according to the present invention to articles in a hospital, a nursing facility and the like. For example, the cloth according to the present invention is used as sheets of a bed, and is thereby used for sensing a position to which a stress is applied, and for assisting turning from side to side. Moreover, the cloth according to the present invention is used in a form of clothes, and is thereby used for detecting a spot to which a stress is applied, and for inducing deformation for changing a ventilation amount. The above-described use of the cloth in the hospital and the like is also effective.

EXAMPLES

The present invention will be described below more specifically based on examples.

Example 1

A wet spinning method was utilized. Acetone (made by Wako Kagaku Industry Corporation; 019-00353) was used for a solvent phase, and a water dispersion (Baytron P (registered trademark) made by H.C. Starck Ltd.) of conductive polymer PEDOT/PSS, which was filtered once, was extruded from a microsyringe (made by Ito Corporation; MS-GLL100; needle inner diameter: 260 µm) at a speed of 2 µL/min, whereby a conductive polymer fiber with a diameter of approximately 10 µm was obtained. Conductivity of the obtained conductive polymer fiber was calculated as an inverse number (S/cm) of a resistivity ($\Omega\cdot$cm) obtained by a measurement in conformity with JIS K 7194 (testing method for resistivity of conductive plastics with a four-point probe array). As a result of the calculation, the conductivity became approximately 1 S/cm.

The obtained conductive polymer fiber was cut into a length of 50 mm, and bundles, each of which had 5000 pieces, were formed.

On a surface of each of the bundles, an aqueous polyester emulsion (made by Nippon NSC Ltd.; AA-64) was coated, followed by drying at 25° C. for 24 hours. A thickness of the obtained bundle became approximately 1 mm.

40 pieces of the coated bundles were prepared, and a fabric with 20 warp yarns and 20 weft yarns was formed. In the obtained fabric, a fabric shape was formed on a center square of approximately 40 mm.

Example 2

Bundles coated in a similar way to Example 1 were formed, and were used only for warp yarns. For weft yarns, bundles, each of which had 5000 fibers made by polyethylene terephthalate (diameter: 15 µm; made by Kanebo Synthetic Fiber Co., Ltd.), were used. A fabric was obtained from the warp yarns and the weft yarns.

Example 3

An acrylonitrile solution (resin concentration: 25%) containing N,N-dimethylacetoamide (DMAC) as a solvent was ejected from a core portion of a mouthpiece of a core-sheath wet spinning machine, and PEDOT/PSS was ejected from a sheath portion of the mouthpiece of the core-sheath wet spinning machine, respectively, into DMAC (concentration: 85%), at the same time at a speed of 0.2 mL/min. In such a way, core-sheath fibers (diameter: 15 µm; sheath portion amount: approximately 30%; sheath portion porosity: approximately 30%) were obtained.

The obtained fibers were formed into bundles, and the bundles were formed into a fabric.

Example 4

In a similar way to Example 3, an acrylonitrile solution (resin concentration: 25%) containing DMAC as a solvent was ejected from one of mouthpieces of a side-by-side wet spinning machine and PEDOT/PSS was ejected from the other of mouthpieces of the side-by-side wet spinning machine, respectively, into DMAC (concentration: 85%), at the same time at a speed of 0.2 mL/min. In such a way, side-by-side fibers (diameter: 15 µm) were obtained.

The obtained fibers were formed into bundles, and the bundles were used as warp yarns to form a fabric.

Example 5

A conductive polymer fiber was obtained under similar conditions to those of Example 1. The conductive polymer fiber was formed into bundles while maintaining a long fiber state thereof. On the bundles, an aqueous acrylic emulsion (made by Nippon NSC Ltd.; AA-64) was coated by continuous steps so that a final fiber diameter could become 15 µm, followed by drying at 25° C. for 24 hours.

The fibers thus bundled were used as warp yarns to form a fabric.

Example 6

A conductive polymer fiber was obtained under similar conditions to those of Example 1. On surfaces of bundles formed of the conductive polymer fiber, an aqueous polyester emulsion (made by Nippon NSC Ltd.; AA-64), into which approximately 10 mass% of sodium hydrogen carbonate of a thermal decomposition type was mixed as a foaming agent, was coated, followed by drying for 24 hours while allowing gentle foaming under an environment of 50° C. The surface of the obtained bundles became porous (porosity: approximately 50%), and bundles with a thickness of approximately 1 mm were obtained.

Example 7

A conductive polymer fiber was obtained under similar conditions to those of Example 1. This fiber was formed into bundles, but was not subjected to the coating process, and a fabric was formed by using the formed bundles only as warp yarns.

Example 8

By a wet spinning method similar to that of Example 1, a conductive polymer fiber with a diameter of approximately 10 µm was obtained while setting a needle inner diameter at 300 µm and an extrusion speed at 5 µL/min. Conductivity of the obtained conductive polymer fiber was approximately 0.1 S/cm.

This fiber was formed into bundles, the bundles were formed into a fabric in a similar way to Example 1, and the fabric was used for an evaluation.

Example 9

A conductive polymer fiber was obtained in a similar way to Example 1 except that 5 mass % of a silver colloid water dispersion (Pastran made by Mitsui Mining & Smelting Co., Ltd.) was added as a conductive component into the PEDOT/PSS water dispersion. Conductivity of the obtained conductive polymer fiber was approximately 10 S/cm.

This fiber was formed into bundles, the bundles were formed into a fabric, and the fabric was used for an evaluation.

Example 10

A conductive polymer fiber was obtained in a similar way to Example 1 except that 10 mass % of a silver colloid water dispersion (Pastran made by Mitsui Mining & Smelting Co., Ltd.) was added as a conductive component into the PEDOT/PSS water dispersion. Conductivity of the obtained conductive polymer fiber was approximately 100 S/cm.

This fiber was formed into bundles, the bundles were formed into a fabric, and the fabric was used for an evaluation.

Example 11

A fiber and bundles were obtained by a wet spinning method and a coating method, which were similar to those of Example 1, except that a 5% polypyrrole aqueous solution (made by Aldrich Corporation) was used as a conductive polymer. Conductivity of the obtained conductive polymer fiber was approximately 10 S/cm.

This fiber was formed into bundles, and a fabric was formed by using the formed bundles as warp yarns, and used for an evaluation.

Example 12

0.4 g of pyrrole and 1.15 g of tetraethylammonium perchlorate were dissolved into propylene carbonate containing 1 vol % of water, whereby a solution of which volume was 100 mL was obtained. Then, the above-described solution was poured into an electrolytic polymerization cell using a platinum plate (length: 100 mm; width: 100 mm; thickness: 0.1 mm) as a positive electrode, and using aluminum foil (length: 200 mm; width: 50 mm; thickness: 0.01 mm) as a negative electrode.

The electrolytic polymerization cell was left in a low-temperature isothermal bath for 30 minutes, and thereafter, was applied with 1.25 mA as a constant current (current density: 0.125 mA/cm$^2$) from a potentiostat for 12 hours, whereby electrolytic polymerization was performed. A polymerization temperature was −20° C.

A polypyrrole film thus obtained was peeled off from the platinum plate, and was washed in propylene carbonate for approximately one hour. Further, the film was vacuum-dried for one day. Then, the dried film was cut into thin straps with a length of 50 mm and a width of 1 mm, and the straps were used as conductive polymer fibers. Conductivity of the film was approximately 100 S/cm.

A fabric was formed by using the fibers thus cut out as warp yarns, and was used for an evaluation.

Example 13

A fiber and bundles were obtained by a wet spinning method and a coating method, which were similar to those of Example 1, except that a 5% polyaniline aqueous solution (made by Aldrich Corporation) was used as a conductive polymer. Conductivity of the obtained conductive polymer fiber was approximately 10 S/cm.

This fiber was formed into bundles, and a fabric was formed by using the formed bundles as warp yarns, and used for an evaluation.

Example 14

A fiber was fabricated by an electrospinning method. Methanol was added to a 2.5% aqueous solution of paraxylene tetrahydrotiophenium chloride so that a volume percent thereof could be 50 vol %, whereby a raw liquid was obtained. This was extruded from a tip of a needle with an inner diameter of 340 μm while applying a voltage of 5 kV thereto, and precursor fibers were precipitated on an aluminum foil substrate located below the tip of the needle by 20 cm. The obtained precursor fibers were vacuum-dried at 250° C. for 24 hours, and nanofibers (diameter: approximately 10 nm) thus obtained were formed into yarn twists, and a fiber with a diameter of approximately 10 μm was obtained. Conductivity of the conductive polymer fiber thus obtained was approximately 10 S/cm.

This fiber was further formed into bundles, and thereafter, an aqueous polyester emulsion (made by Nippon NSC Ltd.; AA-64) was coated on surfaces of the bundles, followed by drying at 25° C. for 24 hours. The fiber was formed into the bundles as described above, the bundles were formed into a fabric, and the fabric was used for an evaluation.

Example 15

Conductive polymer fibers obtained in a similar way to Example 3 were formed into bundles while maintaining a length thereof, and were subjected to coating in continuous steps. Fibers thus obtained were knitted into a knit jersey.

A cloth-like article with a square of 40 mm, which was obtained in such a manner that both end portions of the above-described knit were cut out, was used for an evaluation. Note that electrodes were arranged for each of the bundles on end portions of the cloth-like article.

Example 16

Figure 31:
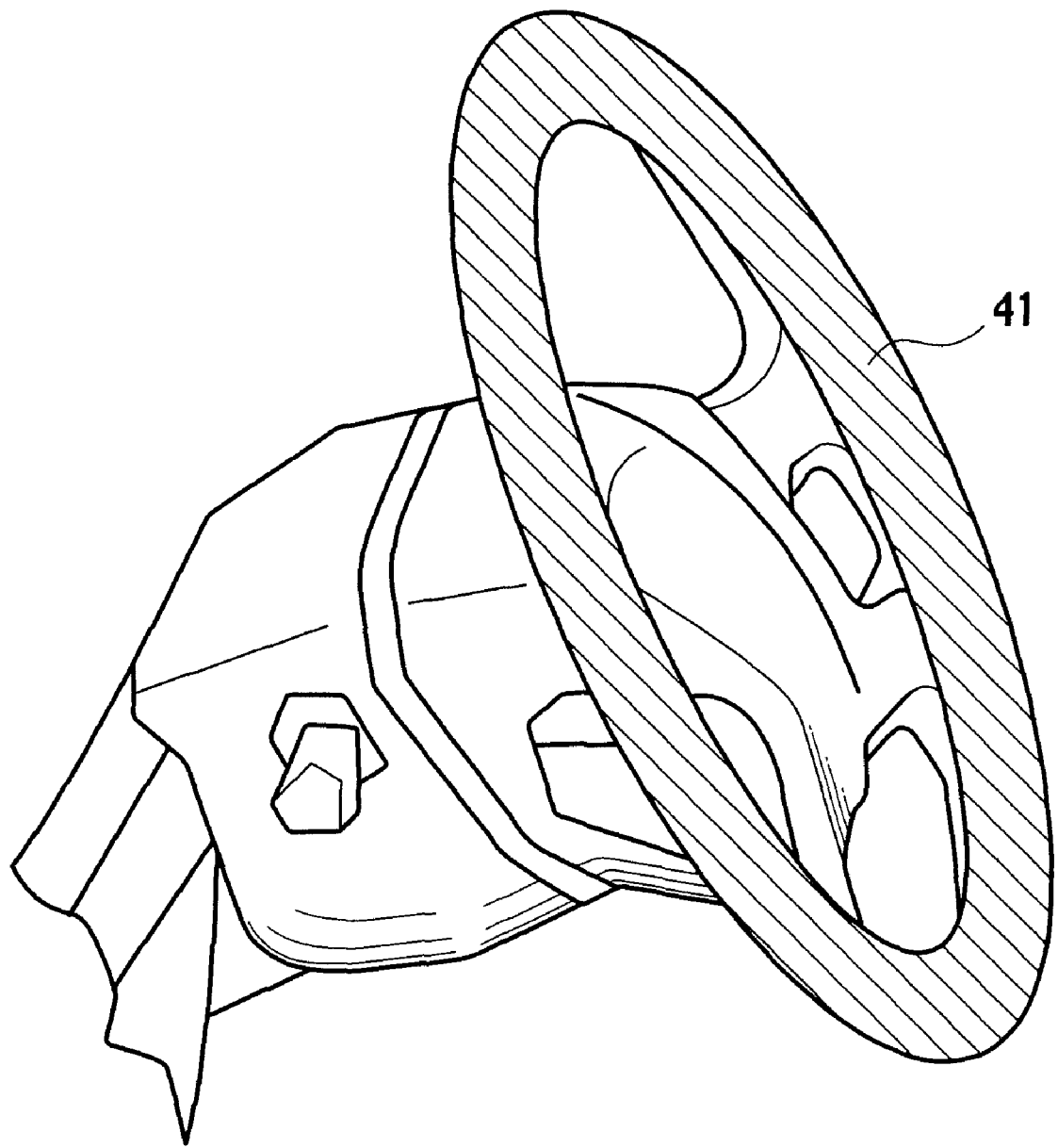
FIG. 31 is a schematic view in which the fabric of the present invention is installed on a steering wheel.

As shown in FIG. 31, the fabric of Example 1 was bound around a steering wheel 41 of a vehicle, and was energized at a frequency of 10 Hz and a voltage of 5V. Then, a driver was able to sense a feeling of vibrations when the fabric was energized. Moreover, every time when a gripped position was changed, a change of the current value was able to be observed. From these, it was recognized that the fabric made of the conductive polymer fibers combined the sensing function and the actuation function.

Example 17

Figure 32:
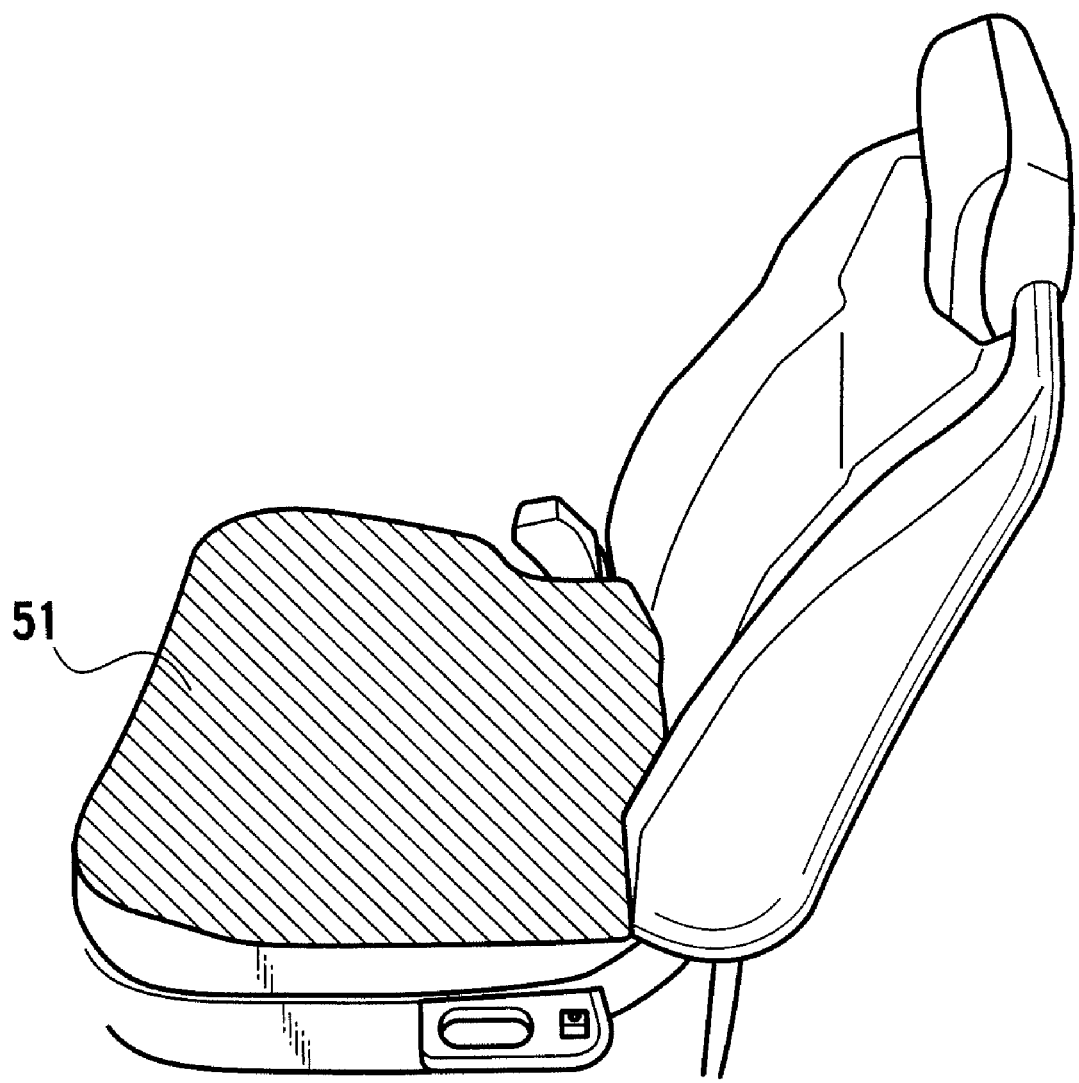
FIG. 32 is a schematic view in which the fabric of the present invention is installed on a seat.

As shown in FIG. 32, the fabric of Example 1 was used for a seat surface 51 of the vehicle, and a value of a current flowing therethrough was measured. Then, it was able to be measured that such a current value was changed in response to a motion of buttocks while the driver was driving. Moreover, a voltage of 5V was applied to the bundles which were not used for the sensing, the bundles being in a portion having received a large motion input, whereby an input was able to be made to the buttocks.

Example 18

In a similar way to Example 12, a polypyrrole film was obtained, and was vacuum-dried. Thereafter, the polypyrrole film was exposed to a hydrochloric acid vapor for 30 seconds under the normal pressure, and was cut into thin straps with a length of 50 mm and a width of 1 mm, and the straps were used as conductive polymer fibers. Conductivity of the film was approximately 450 S/cm.

A fabric was formed by using the fibers thus cut out as warp yarns, and was used for an evaluation.

Example 19

In a similar way to Example 12, a polypyrrole film was obtained, and was vacuum-dried. Thereafter, the polypyrrole film was exposed to a hydrochloric acid vapor for 60 seconds under the normal pressure, and was cut into thin straps with a length of 50 mm and a width of 1 mm, and the straps were used as conductive polymer fibers. Conductivity of the film was approximately 600 S/cm.

A fabric was formed by using the fibers thus cut out as warp yarns, and was used for an evaluation.

Comparative Example 1

Bundles, each of which had 5000 pieces of PET long fibers (fiber diameter: 15 μm; made by Kanebo Synthetic Fiber Co., Ltd.), were formed. A fabric was formed by using the formed fibers as warp yarns and weft yarns, and was used as a comparative example.

Comparative Example 2

A PVDF film (KF Piezo film, made by Kureha. Chemical Industry Co. Ltd.; thickness: 100 μm) having piezoelectric properties was cut out into thin straps with a length of 50 mm and a width of 1 mm, and a fabric was formed by using the fibers thus cut out as warp yarns, and was used as a comparative example. Since electrodes were set on both surfaces of the film, electrodes were arranged for each surface of end portions thereof.

(Evaluation Test)

Figure 33:
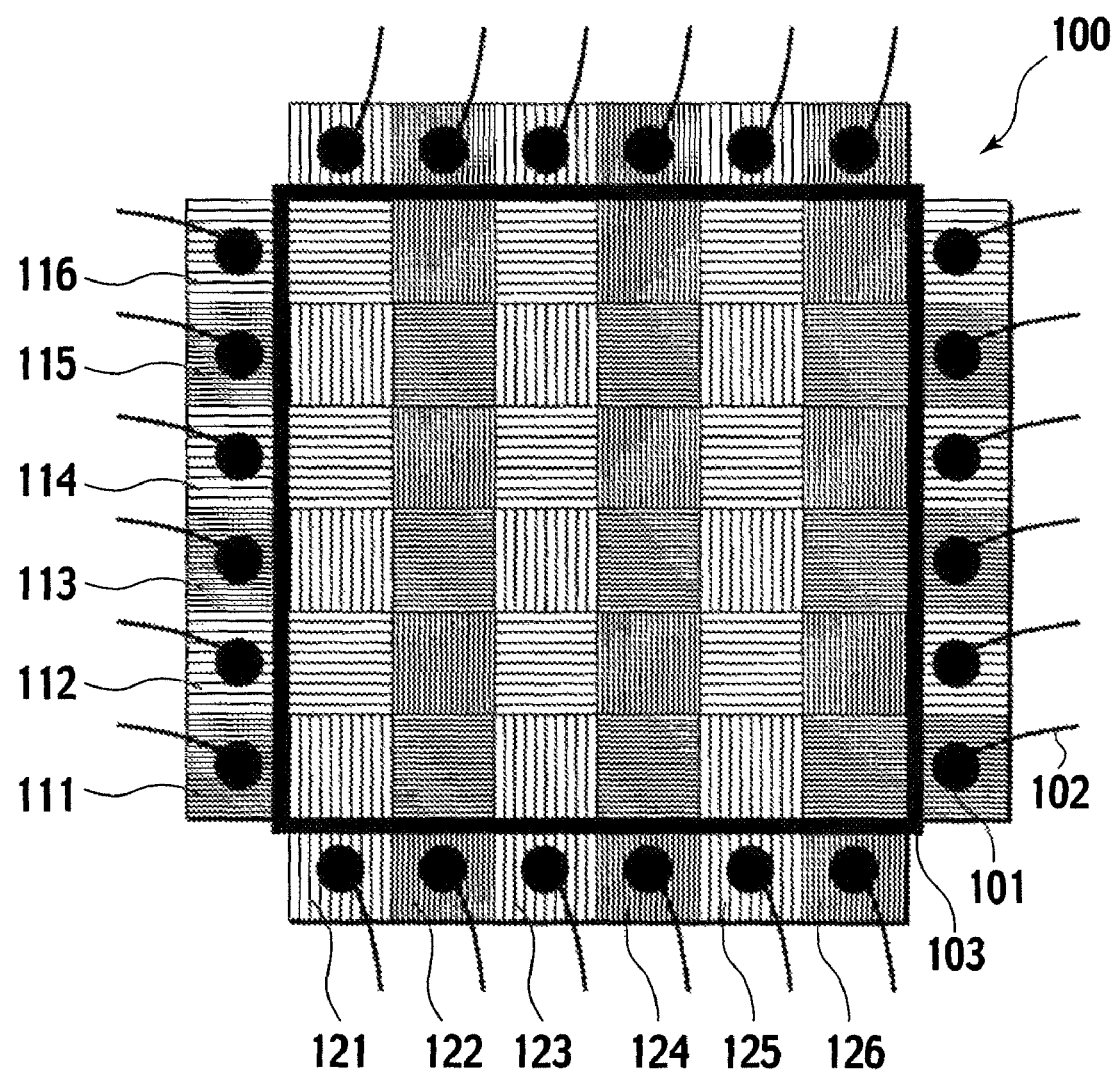
FIG. 33 is a schematic view of an evaluation method according to the present invention.

The fabrics and the knits, which were obtained in Examples 1 to 19 and Comparative examples 1 and 2, were cut out into pieces with a square of 40 mm, and were prepared as samples. Copper wires (CU-111086 made by The Nilaco Corporation) with a diameter of 0.025 mm were connected to both ends of the used bundles of the conductive polymer fibers by a conductive paste (D-500 made by Fujikurakasei Co., Ltd.), outer circumferential portions of the samples were fixed, and the following tests were performed. FIG. 33 is an example where a sample 100 is the fabric, in which copper wires 102 are connected as terminals to both end portions of weft yarns 111 to 116 and warp yarns 121 to 126 while interposing a conductive paste 101 therebetween. The outer circumference of the sample was fixed by a frame 103. Each of the copper wires 103 connected to both end portions of the respective yarns which are the weft yarns 111 to 116 and the warp yarns 121 to 126 is connected to a detection device of a current value and/or a resistance value, whereby a current value and/or resistance value of each of the yarns is adapted to be measurable.

(Evaluation Test 1)

Sensing Performance Test 1: Indenter Slide Test

Figure 34:
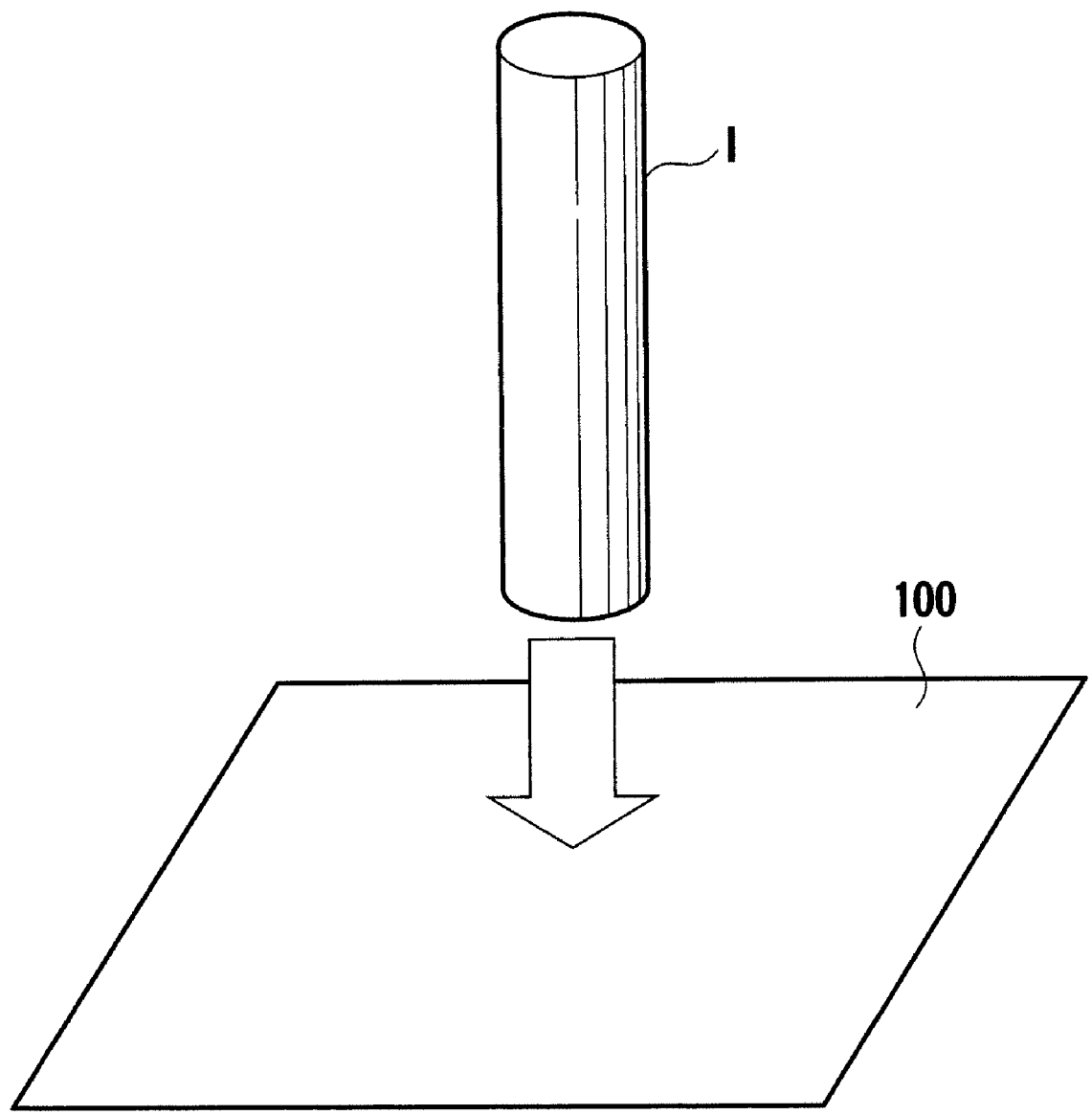
FIG. 34 is a schematic view of an evaluation method according to the present invention.
Figure 35:
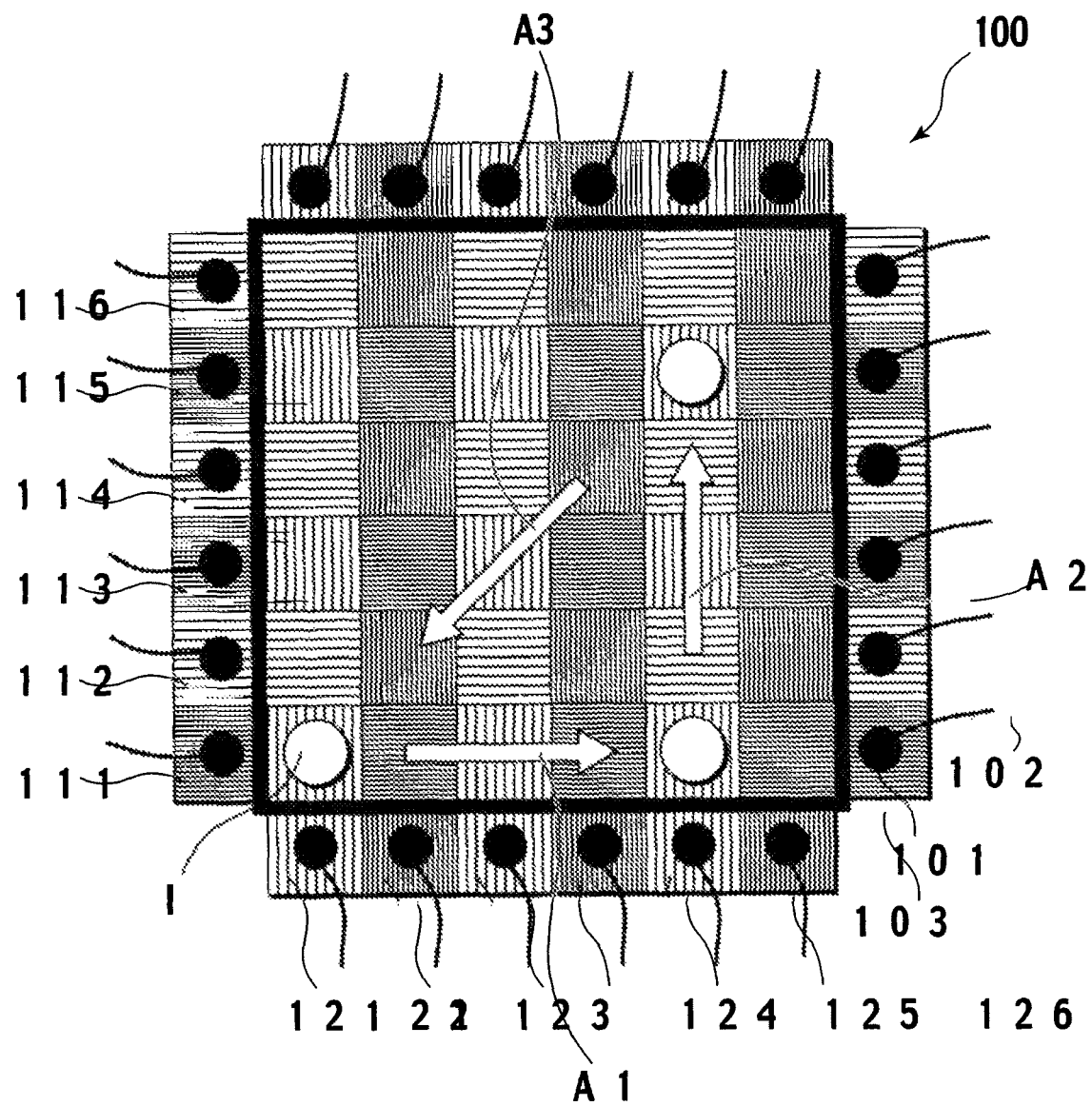
FIG. 35 is a schematic view of an evaluation method according to the present invention.

As shown in FIG. 34, an indenter I having a diameter of 5 mm and a circular tip end portion is thrust against the sample 100 with a force of 0.3 N. While being kept thrust against the sample 100, the indenter I is slid by 30 mm for 10 seconds, in which a motion is shown by arrows A1 to A3 in FIG. 35. Then, a change in the current value of each bundle with time is measured.

(Evaluation Test 2)

Sensing Performance Test 2: Indenter Piston Slide Test

Figure 36:
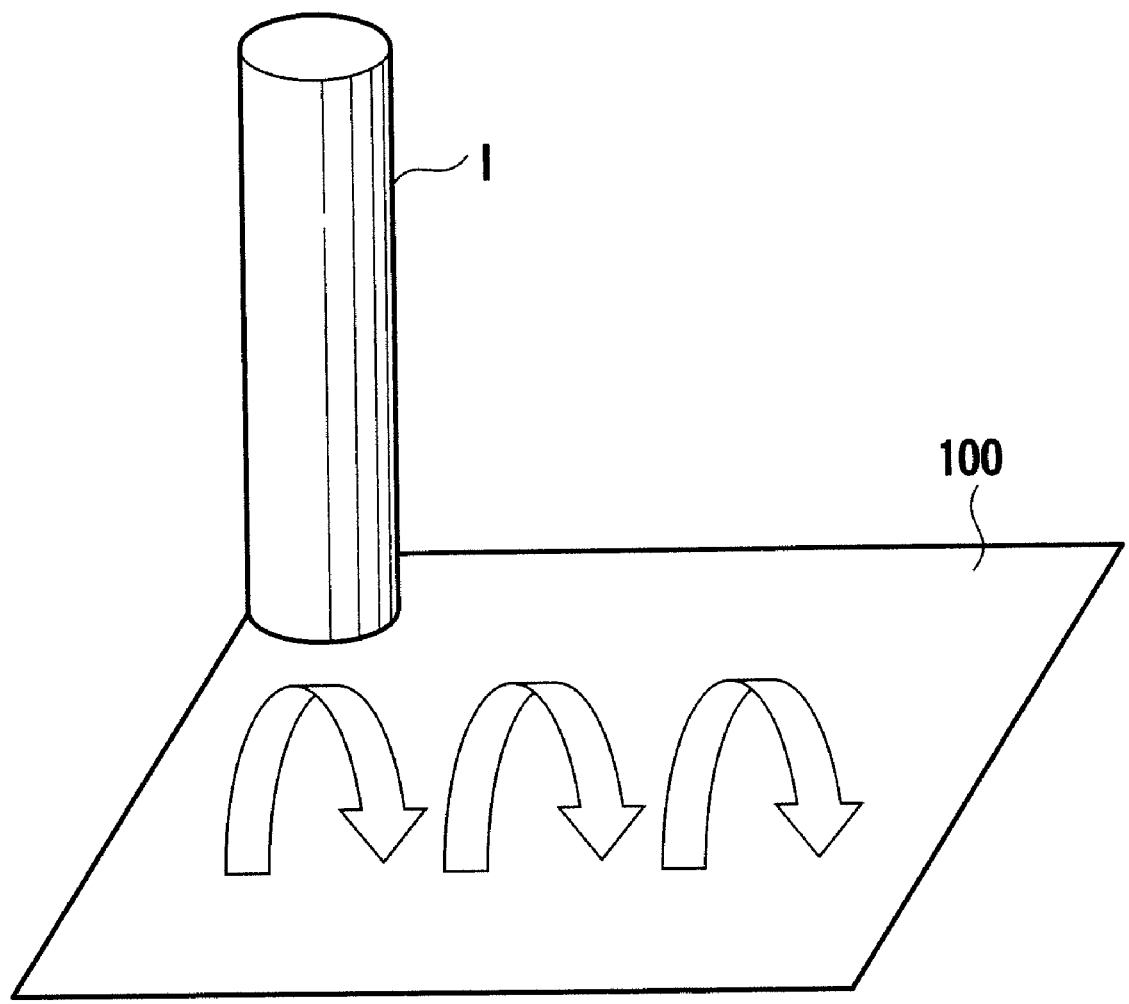
FIG. 36 is a schematic view of an evaluation method according to the present invention.

As shown in FIG. 36, the indenter I is slid while being vertically moved with a sine wave of 0.5 Hz while using similar jigs and conditions to those of Evaluation test 1.

Results of Evaluation test 1 and Evaluation test 2 are represented by whether or not there is a difference therebetween.

(Evaluation Test 3)

Actuation Performance Test

Figure 37:
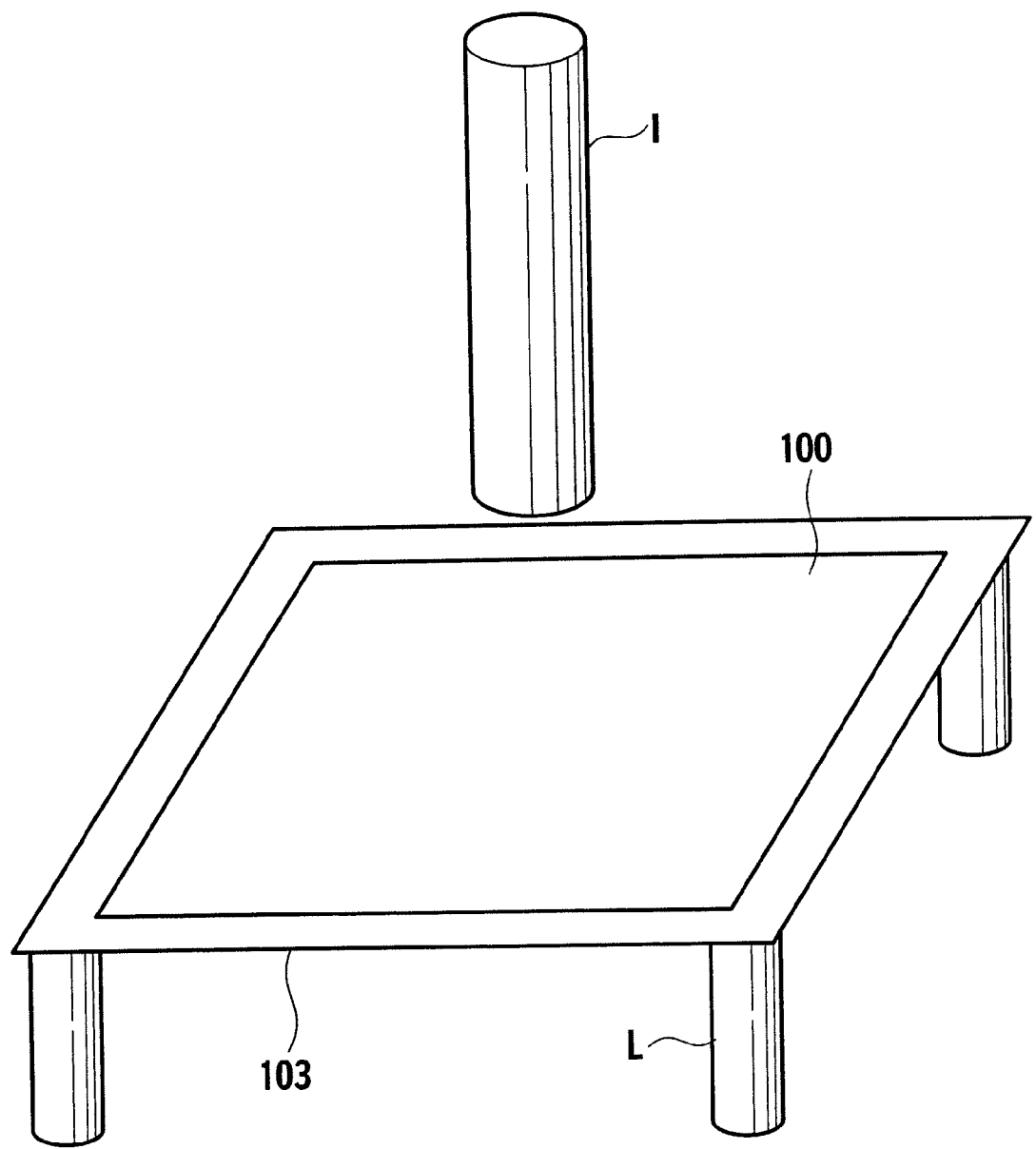
FIG. 37 is a schematic view of an evaluation method according to the present invention.

As shown in FIG. 37, the outer circumference of the sample 100 is fixed by the frame 103, and four corners of the frame 103 are supported by legs L, whereby the sample 100 is set in a state of being floated on a test bench. In this state, the indenter I is thrust against a center portion of the sample 100 with a force of 0.3 N. A voltage of 5V is applied to the sample 100, and a stress generated in this case is measured by using a load cell (LTS-500GA made by Kyowa Electronic Instruments Co., Ltd.). A result of the measurement is represented by the generated stress.

Conditions of the materials to be evaluated are shown in Table 1, and the obtained evaluation results are shown in Table 2.

Figure 38:
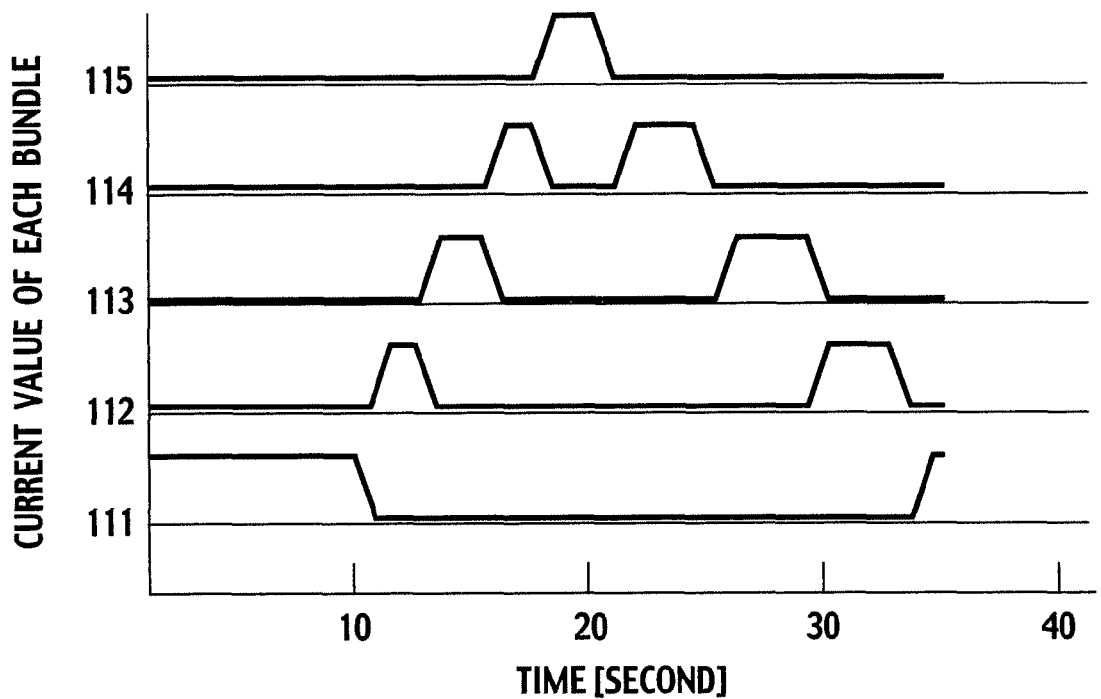
FIG. 38 is a schematic view of evaluation results of Example 1.
Figure 39:
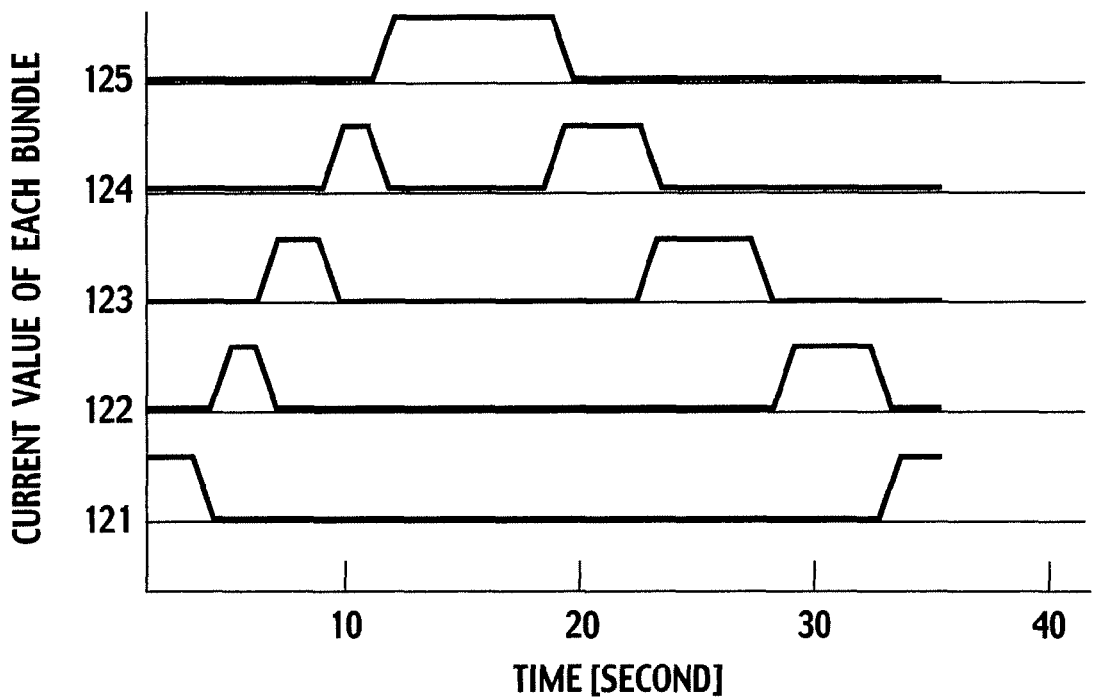
FIG. 39 is a schematic view of evaluation results of Example 1.
Figure 40:
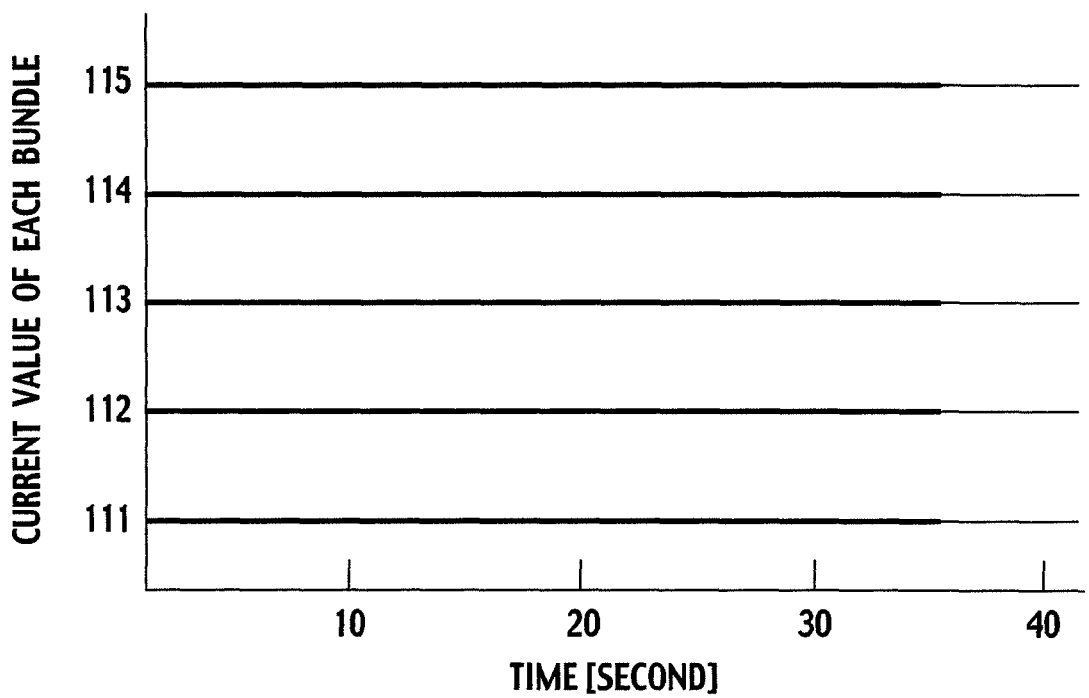
FIG. 40 is a schematic view of evaluation results of Comparative example 1.
Figure 41:
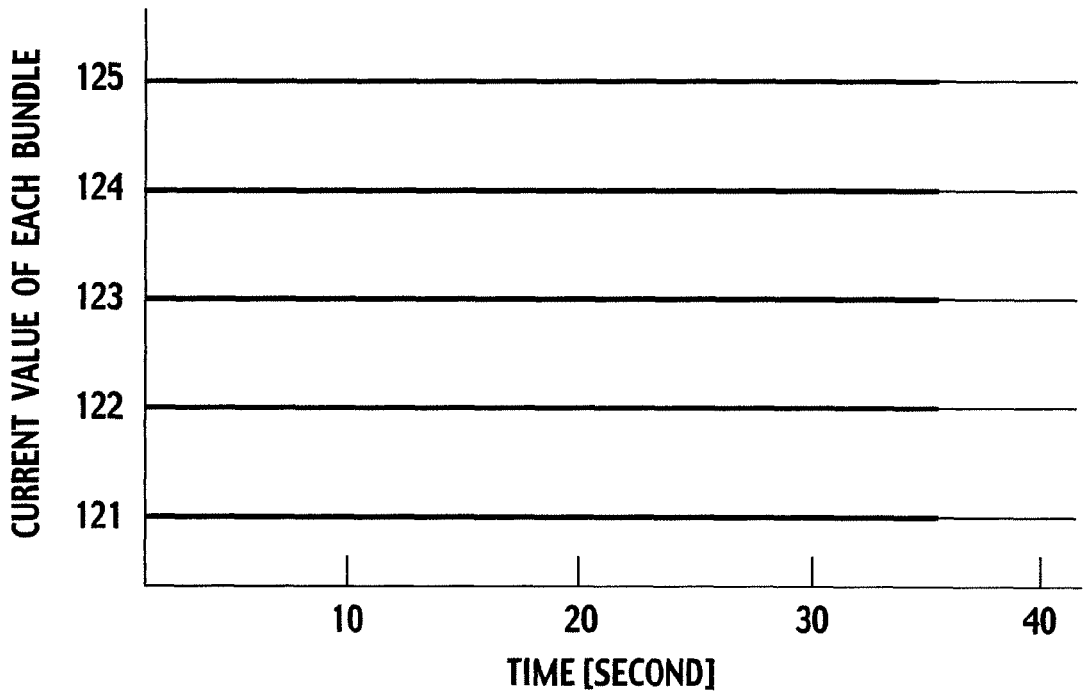
FIG. 41 is a schematic view of evaluation results of Comparative example 1.
Figure 42:
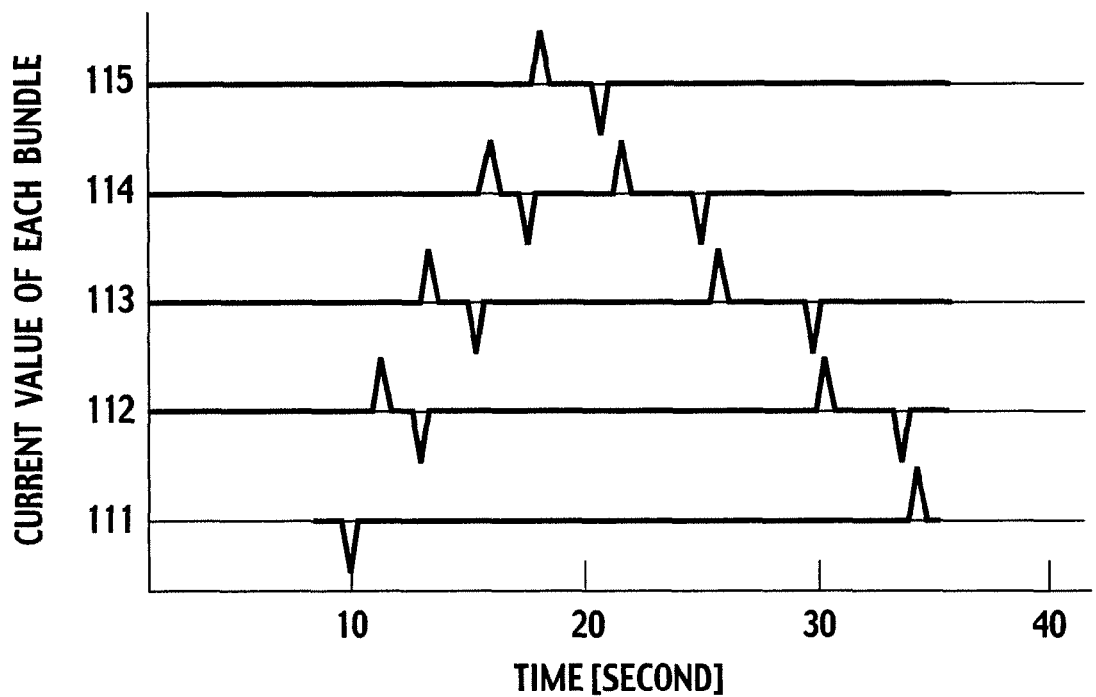
FIG. 42 is a schematic view of evaluation results of Comparative example 2.
Figure 43:
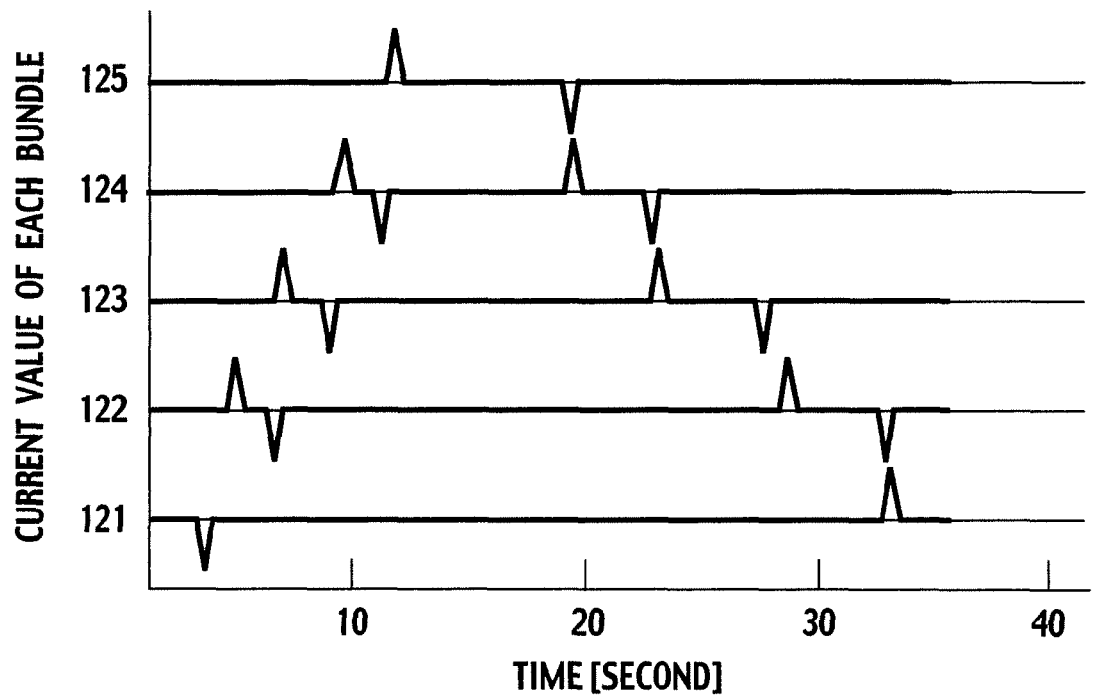
FIG. 43 is a schematic view of evaluation results of Comparative example 2.
Figure 44:
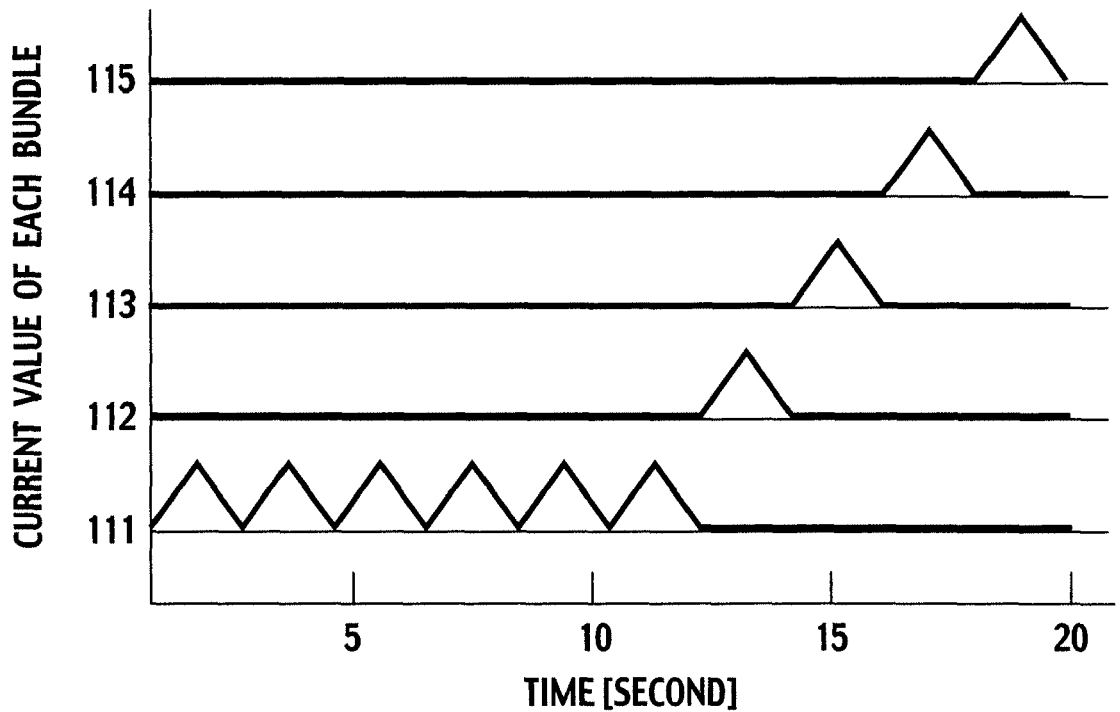
FIG. 44 is a schematic view of evaluation results of Example 1.
Figure 45:
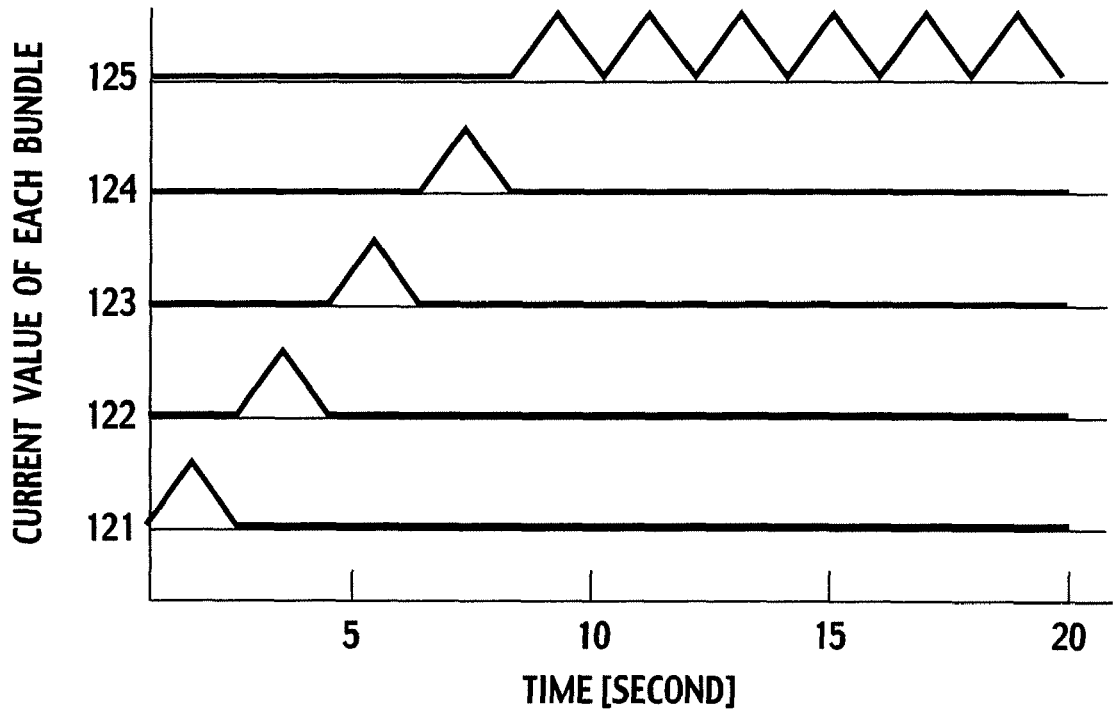
FIG. 45 is a schematic view of evaluation results of Example 1.
Figure 46:
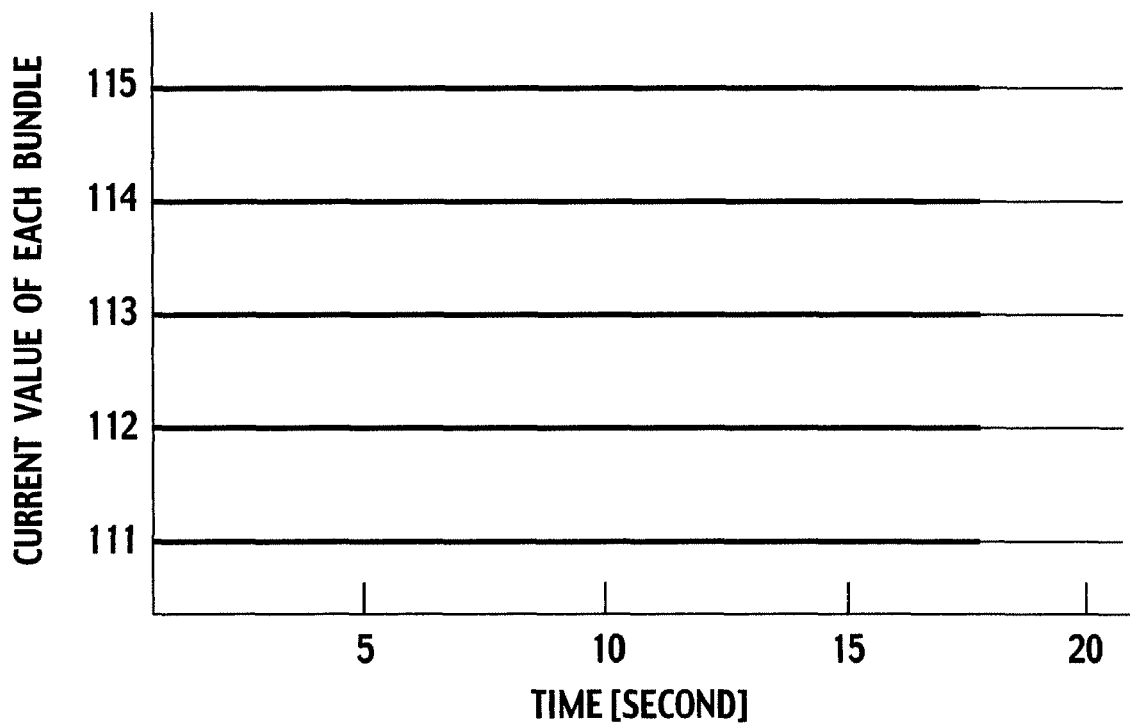
FIG. 46 is a schematic view of evaluation results of Comparative example 1.
Figure 47:
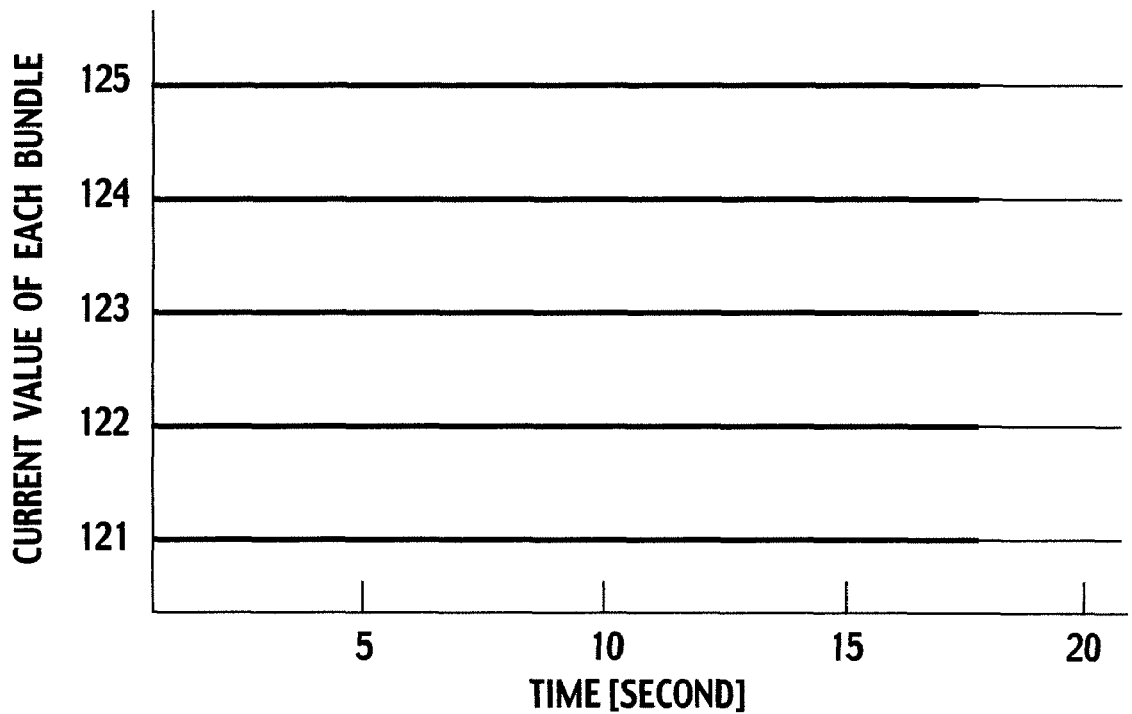
FIG. 47 is a schematic view of evaluation results of Comparative example 1.
Figure 48:
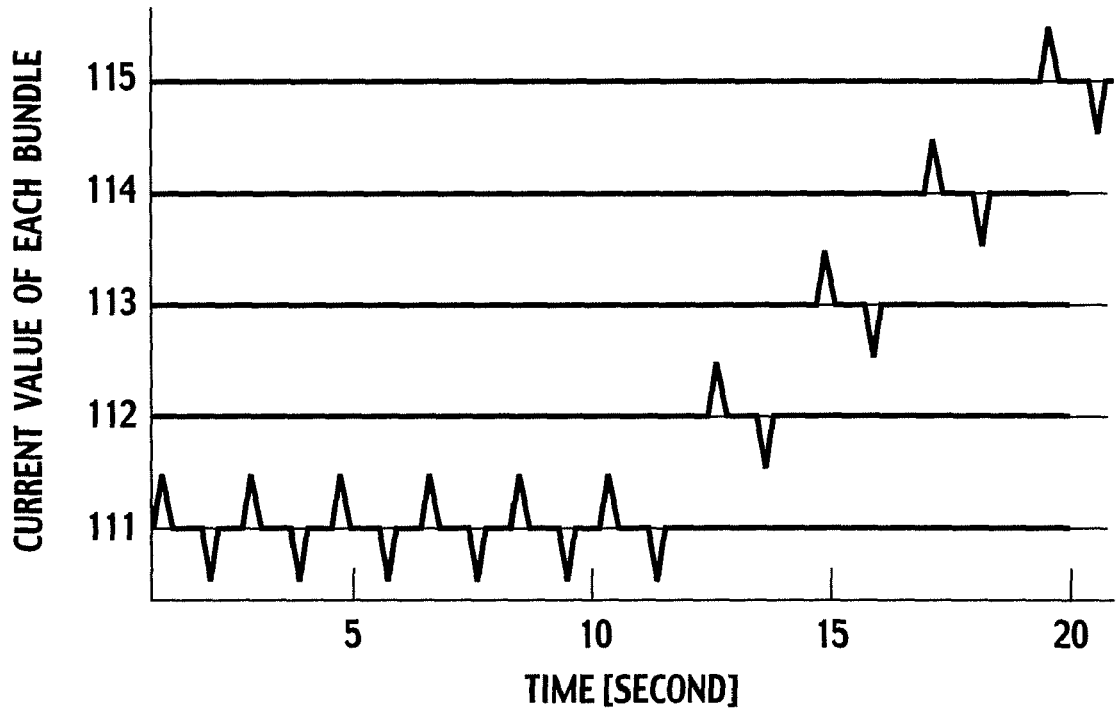
FIG. 48 is a schematic view of evaluation results of Comparative example 2.
Figure 49:
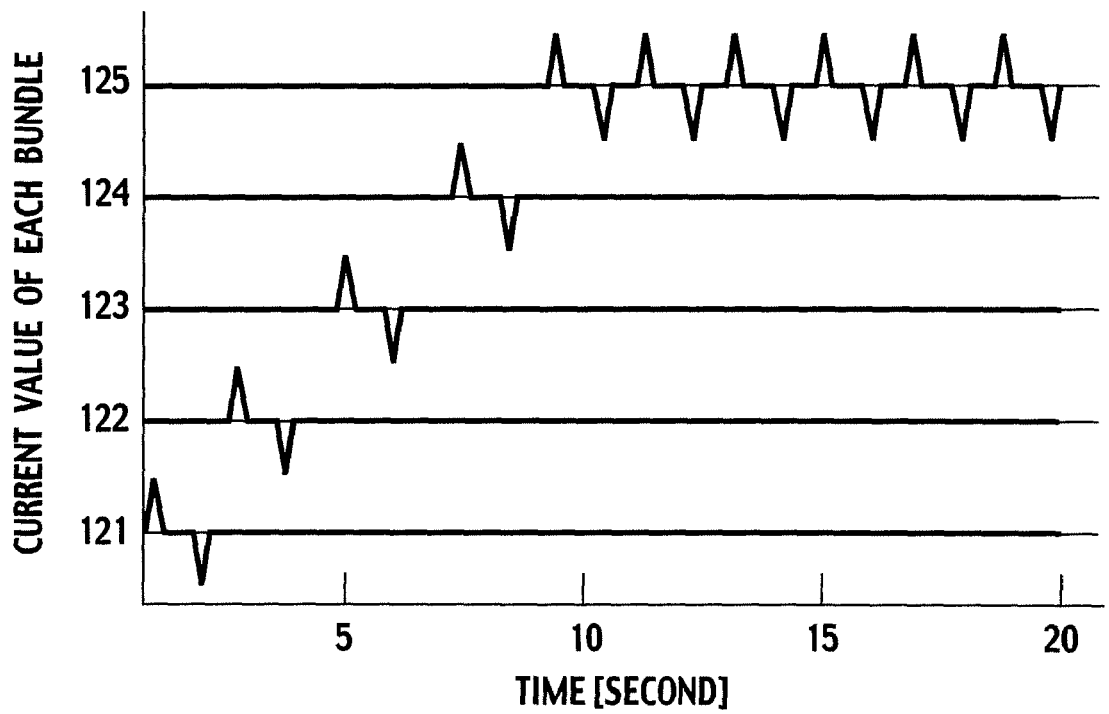
FIG. 49 is a schematic view of evaluation results of Comparative example 2.

Moreover, examples of the results of the evaluation tests are shown in FIGS. 38 to 49. Current sensing waveforms from five weft yarns and five warp yarns in each center region with a square of 30 mm are illustrated. With regard to Evaluation test 1, the results from Example 1 are shown in FIG. 38 (weft yarns) and FIG. 39 (warp yarns), the results of Comparative example 1 are shown in FIG. 40 (weft yarn) and FIG. 41 (warp yarn), and the results of Comparative example 2 are shown in FIG. 42 (weft yarn) and FIG. 43 (warp yarn). With regard to Comparative test 2, the comparison results of Example 1 are shown in FIG. 44 (weft yarn) and FIG. 45 (warp yarn), the comparison results of Comparative example 1 are shown in FIG. 46 (weft yarn) and FIG. 47 (warp yarn), and the comparison results of Comparative example 2 are shown in FIG. 48 (weft yarn) and FIG. 49 (warp yarn).

TABLE 1

| 0 # | Conductive polymer | Spinning method | Conductivity [S/cm] | Coating material | Cross-sectional shape | Area ratio (amount of coating material) | Weaving, knitting |
|---|---|---|---|---|---|---|---|
| Example 1 | PEDOT/PSS | wet spinning | 1 | PET | sea-island | 40% | warp and weft |
| Example 2 | PEDOT/PSS | wet spinning | 1 | PET | sea-island | 40% | only warp |
| Example 3 | PEDOT/PSS | wet spinning | 1 | PAN | core-sheath | 30% (porosity 30%) | only warp |
| Example 4 | PEDOT/PSS | wet spinning | 1 | PAN | side-by-side | 40% | only warp |
| Example 5 | PEDOT/PSS | wet spinning | 1 | PMMA | sea-island | 50% | only warp |
| Example 6 | PEDOT/PSS | wet spinning | 1 | PET | sea-island (porous) | 20% (porosity 50%) | only warp |
| Example 7 | PEDOT/PSS | wet spinning | 1 | none | — | — | only warp |
| Example 8 | PEDOT/PSS | wet spinning | 0.1 | PET | sea-island | 40% | only warp |
| Example 9 | PEDOT/PSS | wet spinning | 10 | PET | sea-island | 40% | only warp |
| Example 10 | PEDOT/PSS | wet spinning | 100 | PET | sea-island | 40% | only warp |
| Example 11 | polypyrrole | wet spinning | 10 | PET | sea-island | 40% | only warp |
| Example 12 | polypyrrole | film cutting | 100 | PET | sea-island | 40% | only warp |
| Example 13 | polyaniline | wet spinning | 10 | PET | sea-island | 40% | only warp |
| Example 14 | PPV | electrospinning | 10 | PET | sea-island | 40% | only warp |
| Example 15 | PEDOT/PSS | wet spinning | 1 | PAN | sea-island | 40% | knitting |
| Example 16 | PEDOT/PSS | wet spinning | 1 | PET | sea-island | 40% | warp and weft |
| Example 17 | PEDOT/PSS | wet spinning | 1 | PET | sea-island | 40% | warp and weft |
| Example 18 | polypyrrole | film cutting | 450 | PET | sea-island | 40% | only warp |
| Example 19 | polypyrrole | film cutting | 600 | PET | sea-island | 40% | only warp |
| Comparative example 1 | — | — | — | PET | — | 100% | — |
| Comparative example 2 | (PVDF) | film cutting | — | — | — | — | only warp |

TABLE 2

| # | Conductive polymer | Difference between evaluation tests 1 and 2 | Magnitude of peak | Evaluation test 3 Generated stress [kPa] |
|---|---|---|---|---|
| Example 1 | PEDOT/PSS | present | large | 76 |
| Example 2 | PEDOT/PSS | present | large | 40 |
| Example 3 | PEDOT/PSS | present | large | 35 |
| Example 4 | PEDOT/PSS | present | large | 38 |
| Example 5 | PEDOT/PSS | present | large | 65 |
| Example 6 | PEDOT/PSS | present | large | 72 |
| Example 7 | PEDOT/PSS | present | large | 80 |
| Example 8 | PEDOT/PSS | present | small | 53 |
| Example 9 | PEDOT/PSS | present | large | 95 |
| Example 10 | PEDOT/PSS | present | large | 110 |
| Example 11 | polypyrrole | present | large | 96 |
| Example 12 | polypyrrole | present | large | 136 |
| Example 13 | polyaniline | present | large | 122 |
| Example 14 | PPV | present | large | 87 |
| Example 15 | PEDOT/PSS | present | large | 73 |
| Example 16 | PEDOT/PSS | present | large | 76 |
| Example 17 | PEDOT/PSS | present | large | 76 |
| Example 18 | polypyrrole | present | large | 130 |
| Example 19 | polypyrrole | present | small | 127 |
| Comparative example 1 | — | none | — | 0 |
| Comparative example 2 | (PVDF) | none | — | 103 |

Figure 50:
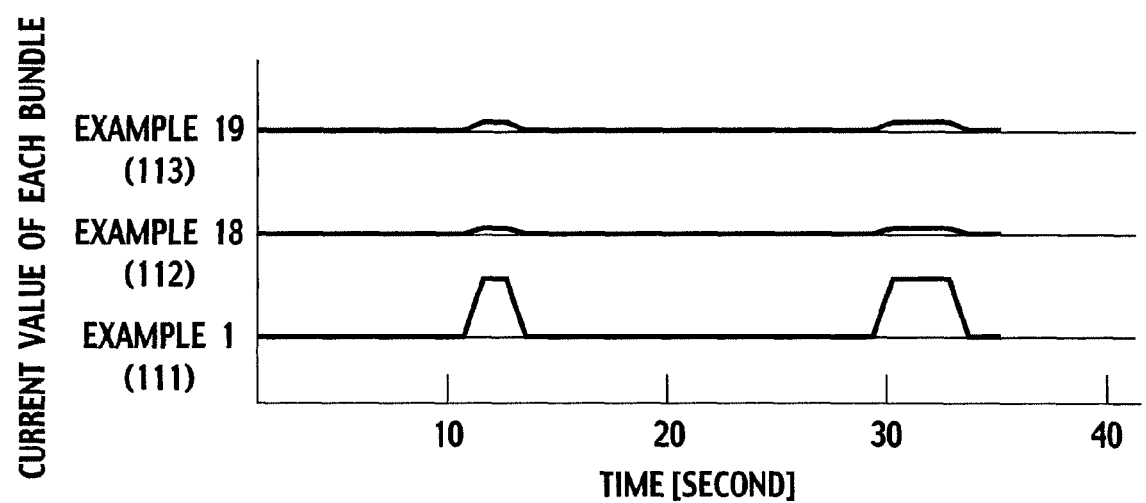
FIG. 50 is a view showing comparisons among peaks of Examples 1, 8 and 19.

As shown in FIGS. 38 to 49, the difference between Evaluation tests 1 and 2 in Table 1 represents whether or not peaks in the test results appear clearly. The magnitude of the difference refers to those mentioned as the following degrees. A large magnitude stands for that large peaks appear clearly (Example 1 in FIG. 50). A small magnitude stands for that, though the peaks are present, it becomes difficult to determine the peaks since a height thereof is decreased because of low current values and/or resistance values. Moreover, the small magnitude stands for that, since the current values and/or the resistance values are too high, the resistance changes owing to the contact between the fibers become less likely to be seen, and the height of the peaks is thereby decreased. Example 19 and Example 8 in FIG. 50 apply to the cases of the small magnitude.

Consequently, in Comparative example 2, though the sensing can be performed, similar signal waveforms are obtained in such a static change with time as in Evaluation test 1 and such a dynamic change as in Evaluation test 3, and it is difficult to distinguish the signal waveforms from each other. As opposed to this, in Example 1, different signals are obtained in both of the tests, and circumstances therein can be grasped.

As results of the tests thus executed, cloth using fibers which combine new sensing function and actuation function in comparison with the comparative examples was able to be obtained.

The entire contents of Japanese Patent Application No. 2006-006441 (filed on Jan. 13, 2006) and Japanese Patent Application No. 2006-281350 (filed on Oct. 16, 2006) are incorporated herein by reference.

The description has been made above of the embodiment to which the invention made by the inventors is applied. However, the present invention is not limited to the description and the drawings, which are made in accordance with the embodiment and constitute a part of the disclosure of the present invention. It is additionally noted here that, specifically, other embodiments, examples, application technologies, and the like, which are made by those skilled in the art based on the above-described embodiment, are entirely incorporated in the scope of the present invention.

The invention claimed is:

1. Cloth for an electric device, comprising:
   bundles made of fibers including conductive polymer fibers containing at least one selected from the group consisting of polypyrrole, polyaniline, PEDOT/PSS in which poly4-styrenesulfonate is doped into poly3,4-ethylenedioxythiophene, and paraphenylene vinylene; and
   terminals provided on an outside of a region on which a force acts on the bundles,
   wherein the cloth is configured such that when the force is applied to a bundle, there is an increase in contact points between the conductive polymer fibers of the bundle with adjacent conductive polymer fibers of the bundle, such that a resistance value of an entirety of the bundle is decreased in comparison to before the force is applied to the bundle.

2. Pressure sensing cloth, comprising:
   bundles made of fibers including conductive polymer fibers containing at least one selected from the group consisting of polypyrrole, polyaniline, PEDOT/PSS in which poly4-styrenesulfonate is doped into poly3,4-ethylenedioxythiophene, and paraphenylene vinylene; and
   a current value and/or resistance value detection device that measures a current value and/or resistance value of the conductive polymer fibers included in the bundles,
   wherein terminals connected to the current value and/or resistance value detection device are provided on an outside of a region on which a force acts in the bundles, and
   wherein the cloth is configured such that when the force is applied to a bundle, there is an increase in contact points between the conductive polymer fibers of the bundle with adjacent conductive polymer fibers of the bundle, such that a resistance value of an entirety of the bundle is decreased in comparison to before the force is applied to the bundle.

3. The pressure sensing cloth according to claim 2, wherein a conductivity of the conductive polymer fibers is within a range of 0.1 to 600 S/cm.

4. The pressure sensing cloth according to claim 2, wherein a conductivity of the conductive polymer fibers is within a range of 1 to 450 S/cm.

5. A vehicular component comprising: a pressure sensing cloth according to claim 2.

6. The pressure sensing cloth according to claim 2, wherein the cloth is coated with another polymer.

7. The pressure sensing cloth according to claim 2, wherein the conductive polymer fibers have a core-sheath, side-by-side or sea-island cross-sectional shape formed in such a manner that the conductive polymer fibers are combined with another polymer.

8. The pressure sensing cloth according to claim 7, wherein the another polymer for use in the conductive polymer fibers is an elastomer.

9. The pressure sensing cloth according to claim 7, wherein the another polymer for use in the conductive polymer fibers is a porous body.

10. Actuation cloth, comprising:
    bundles made of fibers including conductive polymer fibers containing at least one selected from the group consisting of polypyrrole, polyaniline, PEDOT/PSS in which poly4-styrenesulfonate is doped into poly3,4-ethylenedioxythiophene, and paraphenylene vinylene; and
    a voltage application device that applies a voltage to the conductive polymer fibers included in the bundles,
    wherein terminals connected to the voltage application device are provided on an outside of a region on which a force acts in the bundles, and
    wherein the cloth is configured such that when the force is applied to a bundle, there is an increase in contact points between the conductive polymer fibers of the bundle with adjacent conductive polymer fibers of the bundle, such that a resistance value of an entirety of the bundle is decreased in comparison to before the force is applied to the bundle.

11. The actuation cloth according to claim 10, wherein the conductive polymer fibers have a core-sheath, side-by-side or sea-island cross-sectional shape formed in such a manner that the conductive polymer fibers are combined with another polymer.

12. A vehicular component comprising: a cloth for an electric device according to claim 1.

13. A vehicular component comprising: a actuation cloth according to claim 10.

* * * * *